US 10,742,277 B2

United States Patent
Kato et al.

(10) Patent No.: US 10,742,277 B2
(45) Date of Patent: Aug. 11, 2020

(54) TERMINAL, BASE STATION, WIRELESS COMMUNICATION SYSTEM, AND METHOD OF ACQUIRING CHANNEL STATE INFORMATION

(71) Applicant: PANASONIC INTELLECTUAL PROPERTY MANAGEMENT CO., LTD., Osaka (JP)

(72) Inventors: Osamu Kato, Fukuoka (JP); Noriyuki Shimizu, Kanagawa (JP); Hideki Shingu, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/500,055

(22) PCT Filed: Apr. 4, 2018

(86) PCT No.: PCT/JP2018/014495
§ 371 (c)(1),
(2) Date: Oct. 1, 2019

(87) PCT Pub. No.: WO2018/186459
PCT Pub. Date: Oct. 11, 2018

(65) Prior Publication Data
US 2020/0059275 A1 Feb. 20, 2020

(30) Foreign Application Priority Data
Apr. 6, 2017 (JP) .................................. 2017-076079

(51) Int. Cl.
*H04H 20/71* (2008.01)
*H04B 7/0452* (2017.01)
(Continued)

(52) U.S. Cl.
CPC ......... *H04B 7/0452* (2013.01); *H04B 7/0417* (2013.01); *H04B 7/0626* (2013.01); *H04B 7/0643* (2013.01); *H04B 7/0697* (2013.01)

(58) Field of Classification Search
CPC ....... H04W 4/06; H04W 72/04; H04W 88/08; H04W 76/00
See application file for complete search history.

(56) References Cited

U.S. PATENT DOCUMENTS 6,678,526 B1* 1/2004 Sugirtharaj ........... H04W 28/26
370/351
2002/0094815 A1* 7/2002 Kanerva ........... H04W 72/1252
455/445
(Continued)

FOREIGN PATENT DOCUMENTS

JP 2015-053569 A 3/2015
JP 2015-513257 A 4/2015
(Continued)

OTHER PUBLICATIONS

International Search Report, dated Jul. 10, 2018, for corresponding International Application No. PCT/JP2018/014495, 6 pages.

*Primary Examiner* — Siren Wei
(74) *Attorney, Agent, or Firm* — Seed IP Law Group LLP

(57) ABSTRACT

A base station includes a memory holding information on P terminals in connecting to the base station, where P is an integer of 3 or more, a determination unit that determines L terminals to transmit a reference symbol used for measurement of channel state information indicating a state of a propagation path to the base station from among the P terminals based on the information on the P terminals, at every data transmission cycle, where L is an integer satisfying 2≤L<P, a selector that selects M terminals capable of spatial multiplexing communication in the data transmission cycle based on a measurement result of the channel state
(Continued)

information based on reception of the reference symbol transmitted from L terminals, where M is an integer satisfying $2 \leq M \leq L$, and receives respective pieces of data transmitted from the M terminals via a plurality of antennas.

13 Claims, 9 Drawing Sheets

(51) Int. Cl.
*H04B 7/0417* (2017.01)
*H04B 7/06* (2006.01)

(56) References Cited

U.S. PATENT DOCUMENTS

| | | | |
|---|---|---|---|
| 2004/0082356 A1* | 4/2004 | Walton | H04B 7/0697 455/522 |
| 2009/0011718 A1* | 1/2009 | Chun | H04W 56/00 455/70 |
| 2010/0195588 A1* | 8/2010 | Wan | H04L 1/0027 370/329 |
| 2013/0190024 A1* | 7/2013 | Hayase | H04B 15/00 455/501 |
| 2015/0016379 A1 | 1/2015 | Nam et al. | |
| 2016/0094324 A1 | 3/2016 | Lee et al. | |
| 2016/0197709 A1 | 7/2016 | Shen et al. | |
| 2017/0070267 A1 | 3/2017 | Nabetani et al. | |
| 2017/0208613 A1 | 7/2017 | Nam et al. | |
| 2018/0205443 A1* | 7/2018 | Kumagai | H04B 7/0417 |

FOREIGN PATENT DOCUMENTS

| | | |
|---|---|---|
| JP | 2016-528776 A | 9/2016 |
| JP | 2017-055398 A | 3/2017 |

* cited by examiner

| TERMINAL IDENTIFICATION NUMBER | #1 | #2 | #3 | ... | #53 | ... | #59 | #60 |
|---|---|---|---|---|---|---|---|---|
| ORDER OF CONNECTION WITH BASE STATION | 1 | 2 | 3 | ... | 53 | ... | 59 | 60 |

| TERMINAL INDICATION NUMBER | #7 | #1 | #3 | ... | #60 | ... | #18 | #13 |
|---|---|---|---|---|---|---|---|---|
| AMOUNT OF UL TRANSMISSION DATA [Mbyte] | 27 | 26.1 | 25 | ... | 5.2 | ... | 2.5 | 1.1 |

FIG. 8

| TERMINAL IDENTI- FICATION NUMBER # | GROUP | AMOUNT OF UL TRANS- MISSION- SCHEDULED DATA [Mbyte] | VALUE n OF TERMINAL | UL TRANSMISSION HISTORY OF AT EVERY PAST DATA TRANSMISSION CYCLE LAST··· | NOT TRANSMIT IN LAST r TIMES OF DATA TRANS- MISSION CYCLES | DETERMI- NATION OF CSI-RS TRANS- MISSION |
|---|---|---|---|---|---|---|
| 1 | G1 | 2.5 | 4 | ×××○××... | 5 | PRESENT |
| 2 | G2 | 0.3 | 33 | ××○×××××... | 2 | ABSENT |
| 3 | G3 | 10.0 | 1 | ×○○○××××... | 1 | PRESENT |
| 4 | G4 | 4.5 | 2 | ○×××○○○... | 0 | ABSENT |
| 5 | G5 | 1.8 | 6 | ××○××○××... | 2 | ABSENT |
| 6 | G6 | 0.1 | 100 | ×××××××○... | 8 | ABSENT |
| 7 | G7 | 45.5 | 0 | ○○××○××○... | 0 | PRESENT |
| 8 | G8 | 7.6 | 1 | ××○×××○×... | 2 | PRESENT |
| ... | ... | ... | ... | ... | ... | ... |
| 98 | G8 | 3.8 | 3 | ×○○××××○××... | 1 | ABSENT |
| 99 | G9 | 2.4 | 4 | ×××○×○×××... | 3 | ABSENT |
| 100 | G10 | 12.3 | 1 | ○××××○×○... | 0 | ABSENT |

TERMINAL, BASE STATION, WIRELESS COMMUNICATION SYSTEM, AND METHOD OF ACQUIRING CHANNEL STATE INFORMATION

TECHNICAL FIELD

The present disclosure relates to a terminal, a base station, a wireless communication system, and a method of acquiring channel state information indicating a state of a propagation path in wireless communication from a transmitting side to a receiving side.

BACKGROUND ART

Multi-input multi-output (MIMO) is known as an example of a technology realizing an increase in throughput of a wireless local area network (LAN). In MIMO, it is possible to improve a data rate (that is, frequency utilization efficiency) by sending and receiving data using many antennas on the transmitting side and the receiving side, and also it is possible to perform advanced beamforming. Beamforming is a technology that can give directivity to a transmission beam and/or a received beam and change the shape of the beam arbitrarily by controlling the amplitude and/or phase of at least one of the signal to be transmitted and the signal to be received, at each antenna.

In beamforming, the amplitude and phase of the signal to be received are controlled so that the maximum signal power is obtained at the receiving side, for example, after estimating on what kind of propagation path a signal sent by the transmitting side (for example, terminal) is received at the receiving side (for example, base station). In order for the receiving side to estimate the state of this propagation path, for example, channel state information CSI is used.

CSI indicates channel state information (that is, information indicating a state of a channel that is a propagation path of radio waves in wireless communication) and is measured at the receiving side (for example, base station) based on the quality information when the receiving side receives a reference symbol (RS, hereinafter sometimes referred to as "CSI-RS" or "SRS (Sounding RS)") used to measure the channel state information sent from the transmitting side (for example, terminal). The receiving side (for example, base station) measures channel state information (CSI) indicating a state of a propagation path between the transmitting side and the receiving side based on the reference symbol transmitted from the transmitting side (for example, terminal). The receiving side calculates a channel estimation matrix whose components are transfer functions from each antenna on the transmitting side to each antenna on the receiving side based on the measured channel state information (CSI) and performs beamforming by using this channel estimation matrix. In this way, the receiving side (for example, base station) can perform wireless communication by MIMO with a single transmitting side (for example, terminal) and perform wireless communication (that is, MU (Multiple User)-MIMO spatial multiplexing transmission) by MIMO with a plurality of transmitting sides (for example, terminals).

As the related art relating to sending a data signal by using beamforming in a communication system to which MIMO is applied, for example, Patent Literature 1 has been proposed. In order to be able to transmit data signals by applying beamforming also to user terminals located away from the base station, Patent Literature 1 discloses that a downlink reference signal (for example, channel state measurement reference signal) is transmitted to a user terminal by beamforming using a fixed weight and an appropriate weight is set by using an estimation result from the user terminal.

CITATION LIST

Patent Literature

Patent Literature 1: JP-A-2015-53569

SUMMARY OF INVENTION

Technical Problem

If a plurality of transmitting sides (for example, terminals) and a single receiving side (for example, base station) can communicate data by MU-MIMO, it is expected that a comfortable wireless communication environment can be realized between the transmitting sides and the receiving side. Here, MIMO wireless communication on an uplink (UL) between a plurality of transmitting sides (for example, terminals) and a single receiving side (for example, base station) is assumed. Hereinafter, it is known that an upper limit value (hereinafter, "M" is used as a character indicating the upper limit value for convenience) of the number of spatial multiplexes on the receiving side (for example, base station) in the above-described MU-MIMO is not as large as, for example, about 2 to 8. Therefore, with existing technology, for example, when 100 terminals are in connecting to a base station in a densely populated area such as a stadium, a theme park or a large conference center, the base station may only communicate with up to M terminals within one data transmission cycle, but wireless communication with 100 terminals is realized by the base station switching the terminal that is a data transmission target at every data transmission cycle.

However, in this existing technology, in the case of considering realization of MU-MIMO wireless communication on the premise of upper limit value M, if there are a large number of transmitting sides (for example, terminals) as connection candidates with the receiving side (for example, base station), it is considered that a problem will arise in the following points.

That is, when the base station performs MU-MIMO wireless communication with the M terminals at maximum, if 100 terminals can transmit a reference symbol to the base station at every data transmission cycle, and the base station can select the optimum combination of terminals from among all the currently connected terminals by using the channel state information measured based on the reception of a reference symbol transmitted from 100 terminals, it is ideal from the viewpoint of maximizing uplink frequency utilization efficiency. However, there is a problem that the traffic of the uplink (in other words, from the terminal to the base station) is wasted by an enormous number of reference symbols.

In addition, although the upper limit value M of the number of spatial multiplexing in MU-MIMO is a constant value and only a part of all the terminals is selected to transmit a data signal, if a reference symbol is transmitted from all terminals being in connecting to the base station at every data transmission cycle, there is a problem that the amount of measurement processing of channel state information based on the reception of a reference symbol in the base station that has received all these reference symbols increases, and the processing load on the base station increases. Such problems are not taken into consideration even in Patent Literature 1, so it can be said that the problems remain unresolved.

The present disclosure has been devised in view of the above-described circumstances of the related art, and an object thereof is to provide a terminal, a base station, a wireless communication system, and a method of acquiring channel state information that realize a comfortable MU-MIMO communication environment by adaptively suppressing an increase in uplink traffic caused by transmission of a reference symbol necessary for measurement of uplink channel state information from respective terminals to a base station at every data transmission cycle and an increase in the amount of measurement processing of channel state information based on the reception of a reference symbol at the base station.

Solution to Problem

The present disclosure provides a base station capable of wireless communication with a plurality of terminals, including a memory that holds information on P terminals being in connecting to the base station, where P is an integer of 3 or more, a determination unit that determines L terminals to transmit a reference symbol used for measurement of channel state information indicating a state of a propagation path to the base station from among the P terminals based on the information on the P terminals, at every data transmission cycle, where L is an integer satisfying $2 \leq L < P$, a selector that selects M terminals that are capable of spatial multiplexing communication in the data transmission cycle according to the channel state information based on reception of the reference symbol transmitted from the L terminals, where M is an integer satisfying $2 \leq M \leq L$, and a communicator that receives respective pieces of data transmitted from the M terminals by using the spatial multiplexing communication via a plurality of antennas.

In addition, the present disclosure provides a method of acquiring channel state information in a base station capable of wireless communication with a plurality of terminals, including a step of holding information on P terminals being in connecting to the base station, where P is an integer of 3 or more, a step of determining L terminals to transmit a reference symbol used for measurement of channel state information indicating a state of a propagation path to the base station from among the P terminals based on the information on the P terminals, at every data transmission cycle, where L is an integer satisfying $2 \leq L < P$, a step of selecting M terminals that are capable of spatial multiplexing communication in the data transmission cycle according to the channel state information based on reception of the reference symbol transmitted from the L terminals, where M is an integer satisfying $2 \leq M \leq L$, and a step of receiving respective pieces of data transmitted from the M terminals by using the spatial multiplexing communication via a plurality of antennas.

In addition, the present provides a wireless communication system capable of wireless communication between a plurality of terminals and a base station, the base station holds information on P terminals being in connecting to the base station, where P is an integer of 3 or more, and determines L terminals to transmit a reference symbol used for measurement of channel state information indicating a state of a propagation path to the base station from among the P terminals based on the information on the P terminals, at every data transmission cycle and transmits a transmission instruction of the reference symbol to the L terminals, where L is an integer satisfying $2 \leq L < P$, the terminals transmit the reference symbol based on the transmission instruction of the reference symbol transmitted from the base station, and the base station selects M terminals that are capable of spatial multiplexing communication in the data transmission cycle according to the channel state information based on reception of the reference symbol transmitted from the L terminals, where M is an integer satisfying $2 \leq M \leq L$, and receives respective pieces of data transmitted from the M terminals by using the spatial multiplexing communication via a plurality of antennas.

In addition, the present disclosure provides a terminal capable of communicating with a base station, including a memory that holds information on the terminal, a determination unit that determines necessity of transmission of a reference symbol used for measurement of channel state information indicating a state of a propagation path to the base station based on information on the terminal at every data transmission cycle, and a communicator that transmits the reference symbol to the base station based on the determination of transmission of the reference symbol, in which the communicator transmits data to the base station in a case of being selected as any one of M terminals capable of spatial multiplexing communication with the base station in the data transmission cycle according to the channel state information based on reception of the reference symbol transmitted to the base station, where M is a default value of 2 or more.

In addition, the present disclosure provides a method of acquiring channel state information in a terminal capable of communicating with a base station, including a step of holding information on the terminal, a step of determining necessity of transmission of a reference symbol used for measurement of channel state information indicating a state of a propagation path to the base station based on information on the terminal at every data transmission cycle, and a step of transmitting the reference symbol to the base station based on the determination of transmission of the reference symbol, in which a step of transmitting data to the base station in a case of being selected as any one of M terminals capable of spatial multiplexing communication with the base station in the data transmission cycle according to the channel state information based on reception of the reference symbol transmitted to the base station, where M is a default value of 2 or more.

In addition, the present disclosure provides a wireless communication system capable of wireless communication between a plurality of terminals and a base station, in which the terminals hold information on respective terminals, determine necessity of transmission of a reference symbol used for measurement of channel state information indicating a state of a propagation path to the base station based on information on the respective terminals at every data transmission cycle, and transmit the reference symbol to the base station based on the determination of transmission of the reference symbol, and the base station selects M terminals capable of spatial multiplexing communication in the data transmission cycle according to the channel state information based on reception of the reference symbol transmitted from the terminal, where M is a default value of 2 or more, and receives respective pieces of data transmitted from the selected M terminals capable of spatial multiplexing communication via a plurality of antennas, where M is a default value of 2 or more.

Advantageous Effects of Invention

According to the present disclosure, it is possible to realize a comfortable MU-MIMO communication environment by adaptively suppressing an increase in uplink traffic caused by transmission of a reference symbol necessary for measurement of uplink channel state information from respective terminals to a base station at every data transmission cycle and an increase in the amount of measurement processing of channel state information based on the reception of a reference symbol at the base station.

BRIEF DESCRIPTION OF DRAWINGS

FIG. 8 is a diagram showing an example of terminal-related information for each terminal being in connecting to the base station.

DESCRIPTION OF EMBODIMENTS

Hereinafter, each embodiment specifically disclosing a terminal, a base station, a wireless communication system, and a method of acquiring channel state information according to the present disclosure will be described in detail with reference to drawings as appropriate. However, detailed description more than necessary may be omitted. For example, there are cases where a detailed description of well-known matters and redundant description on substantially the same configuration may be omitted. This is for avoiding unnecessary redundancy of the following description and facilitating understanding by those skilled in the art. The accompanying drawings and the following description are provided to enable those skilled in the art to fully understand the present disclosure and are not intended to limit the claimed subject matters.

Embodiment 1

In Embodiment 1, among all terminals being in connecting to a base station, the base station determines a part of terminals that transmits a reference symbol (hereafter, referred to as "reference symbol" or "CSI-RS"), which is a fixed pattern used to measure channel state information (CSI).

Figure 1:
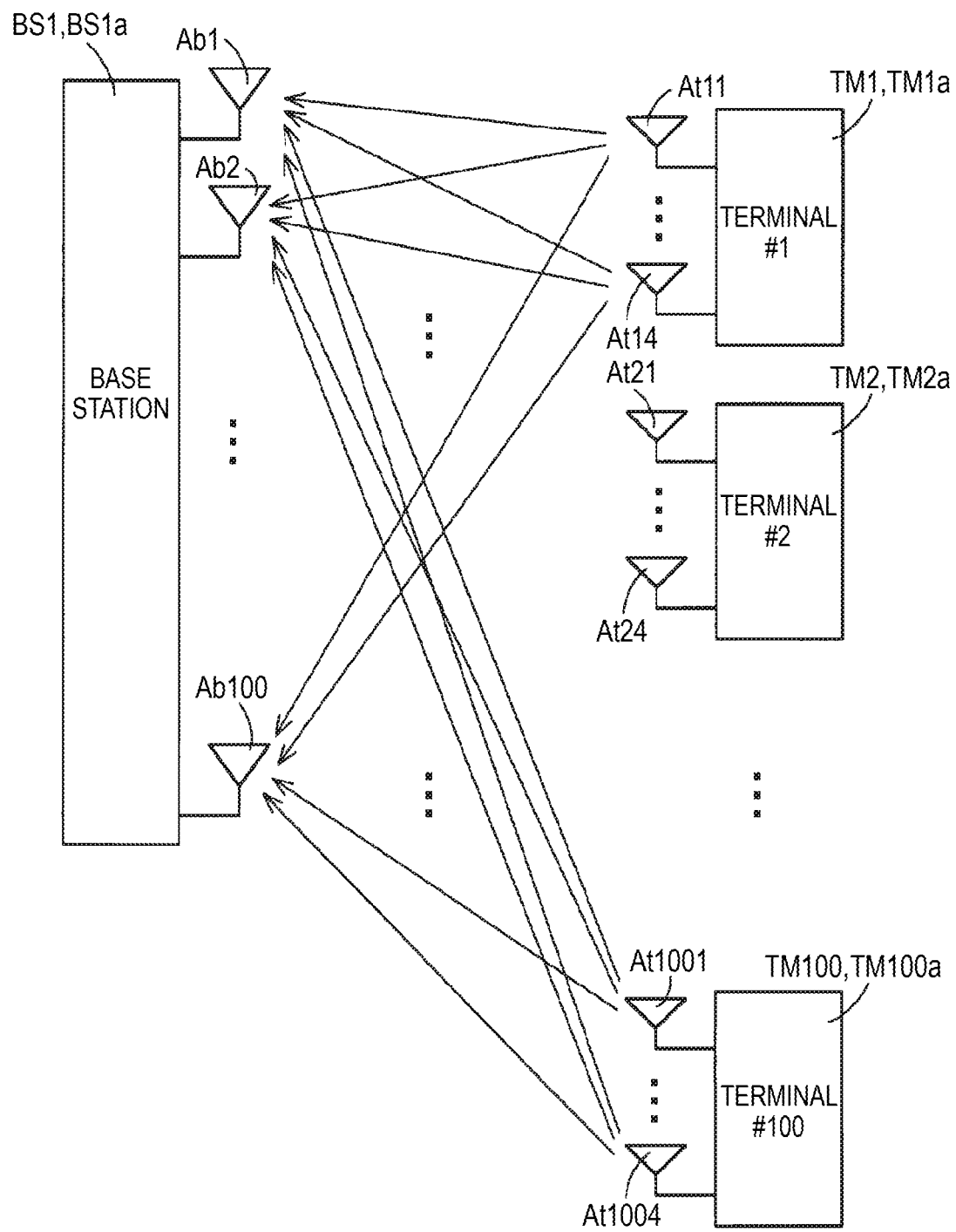
FIG. 1 is a diagram showing an example of a system configuration of a wireless communication system according to each embodiment.

FIG. 1 is a diagram showing an example of a system configuration of wireless communication system 10 according to each embodiment.

In Embodiment 1, wireless communication system 10 is configured to include one base station BS1 and a plurality of terminals TM1, TM2, . . . , TM100. The base station BS1 and the respective terminals can be connected via a wireless communication channel. The wireless communication channel broadly includes various public channels, mobile phone channels, wide area wireless channels, and the like. Hereinafter, an example will be described in which the base station BS1 receives uplink (UL) data transmitted from a predetermined number (see below) of terminals by using spatial multiplexing communication (in other words, multiple user multi input multi output (MU-MIMO) communication). A downlink (DL) is a wireless channel heading from base station BS1 to the terminal, while an uplink is a wireless channel heading from the terminal to base station BS1.

Base station BS1 includes a plurality of antennas Ab1, Ab2, . . . , Ab100. Although the number of installed antennas of base station BS1 is exemplified as 100, it is needless to say that the number of antennas is not limited to 100 but may be, for example, a power of 2 such as 128, 1024 or the like.

The base station BS1 receives uplink transmission data (hereafter, referred to as "UL transmission data") transmitted from M terminals via antennas Ab1 to Ab100, from a predetermined number (hereinafter, M (M: a default integer value of 2 or more)) of terminals that can simultaneously perform spatial multiplexing communication on the same frequency, at every data transmission cycle. That is, M represents the maximum value of the number of spatial multiplexes in one data transmission cycle. M is an integer value of about 2 to 8, for example. For example, FIG. 1 shows that the UL transmission data respectively transmitted from terminal TM1 of the terminal identification number "#1" and terminal TM100 of the terminal identification number "#100", which are selected as M terminals, is received at base station BS1 by spatial multiplexing communication in the same data transmission cycle. The terminal identification number is a number that may identify a terminal, and may be, for example, a telephone number of a terminal or a manufacturing number of a terminal.

Base station BS1 recognizes channel matrix A having transfer function aij from respective antennas i (i: an integer of 1 to 400) of terminals TM1 or TM100 to respective antennas j (an integer of j: 1 to 100) of base station BS1 as components before receiving the UL transmission data from terminal TM1 or terminal TM100. i has a maximum value of 400 in a case where the number of installed antennas of a terminal is 4 and the number of terminals is 100, for example. In this way, multi-user space multiplex transmission (that is, MU-MIMO transmission) between base station BS1 and terminal TM1 or between base station BS1 and terminal TM100 may be realized.

In addition, since transfer function aij varies over time, it is necessary for base station BS1 to acquire transfer function aij by updating transfer function aij, for example, for each data transmission cycle (for example, 1 ms or 10 ms). In order to acquire this transfer function aij, in Embodiment 1, base station BS1 transmits a signal including an instruction to transmit a reference symbol used for measurement of channel state information indicating a state of a propagation path to the base station BS1, to a part of terminals determined by base station BS1, at every data transmission cycle. In a case where the terminal receives a signal including the transmission instruction from base station BS1, the terminal transmits a reference symbol, which is a fixed pattern, used for measurement of channel state information indicating a state of a propagation path to base station BS1, to base station BS1. Base station BS1 receives a reference symbol transmitted from a part of the corresponding terminals and measures channel state information based on the reception. Base station BS1 uses the measurement result of the channel state information to determine up to M terminals to be subjected to uplink transmission and generates a MU-MIMO spatial multiplexing transmission signal from transfer function aij estimated based on channel state information with the M or less terminals, thereby receiving UL transmission data from up to M terminals simultaneously on the same frequency.

In wireless communication system 10, a high-frequency band (for example, 28 GHz band which is being considered for use in 5G (5th generation mobile communication system)) may be assumed as a wireless standard scheme to be used between base station BS1 and respective terminals. A wireless communication scheme to be applied mainly in each embodiment has, for example, a large number of antennas in a base station and has a function of space multiplex communication between the base station and a plurality of terminals, and 5G(5th generation mobile communication system) is a typical example thereof. However, the base station and the terminal in wireless communication system 10 may have different wireless communication standards (for example, wireless communication standards such as long term evolution (LTE), wireless local area network (LAN), digital enhanced cordless telecommunication (DECT), 3G (3rd generation mobile communication system)) at the same time.

The network configured by wireless communication system 10 may not be a C/U separation type network or may be a C/U separation type network. In the present embodiment, a network that is not a C/U separation type is exemplified. That is, in wireless communication system 10, control data communication and user data communication are performed by the same base station BS1.

Base station BS1 is, for example, a small-cell base station or a macro-cell base station capable of providing high-speed throughput based on the 28 GHz band described above. The communicable range of base station BS1 is determined, for example, according to the position and the cell radius of base station BS1. Base station BS1 is placed, for example, in a densely populated area such as a factory, a construction site, a stadium, a theme park, a large conference room such as an international conference center or the like. The terminal also communicates control data and communicates user data with base station BS1. The control data includes data related to C (Control)-Plane. The user data includes data related to U (User)-Plane. The user data includes, for example, image data (for example, moving image and still image), audio data, and a large amount of data.

The C-plane is a communication protocol for communicating control data for call connection and wireless resource allocation in wireless communication. The U-plane is a communication protocol for actually communicating (for example, video communication, audio communication, and data communication) between the terminal and base station BS1 by using the allocated wireless resources.

Figure 2:
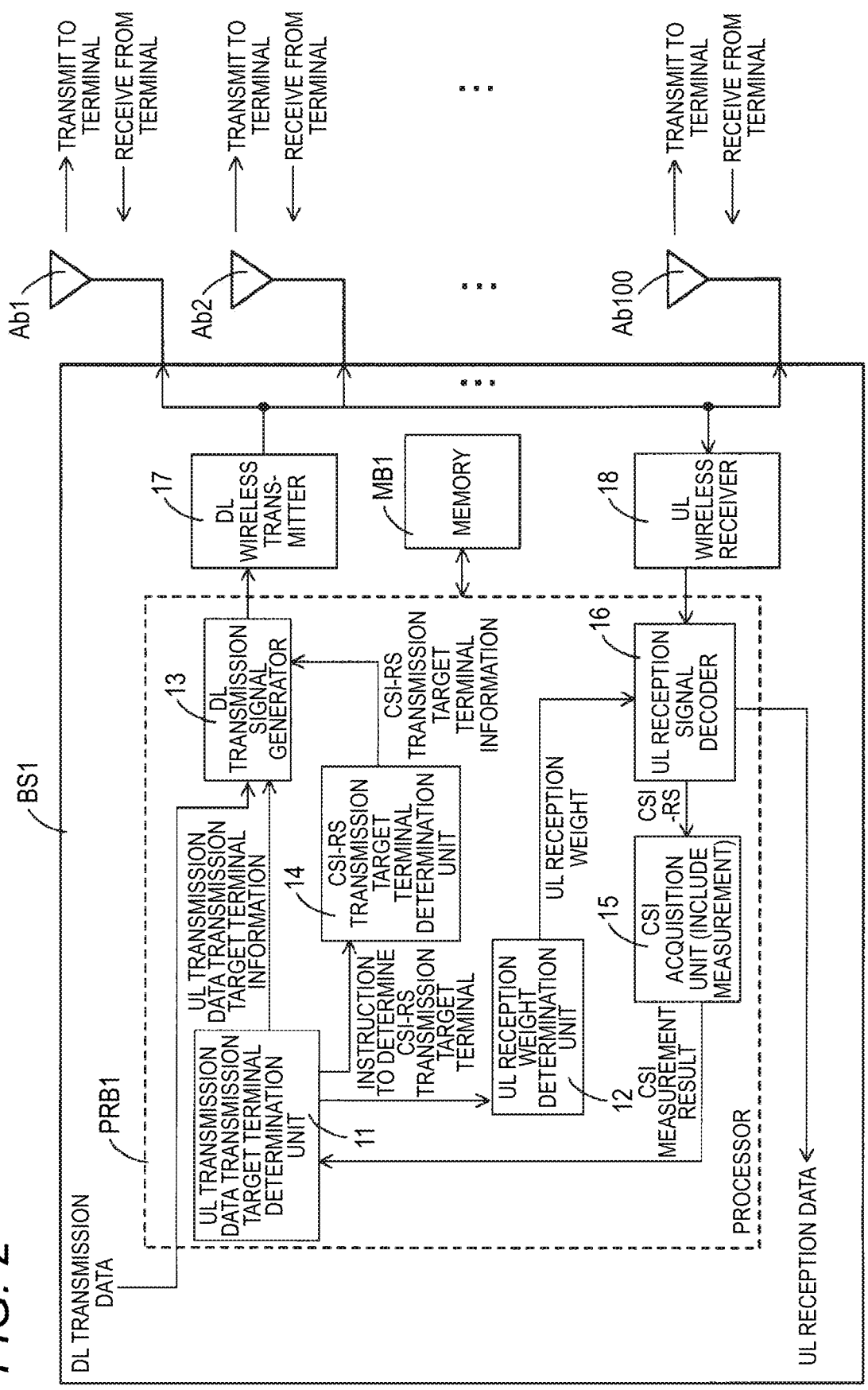
FIG. 2 is a block diagram showing an example of an internal configuration of a base station according to Embodiment 1 in detail.

FIG. 2 is a block diagram showing an example of an internal configuration of base station BS1 according to Embodiment 1 in detail.

Base station BS1 shown in FIG. 2 is configured to include processor PRB1, memory MB1, DL wireless transmitter 17, UL wireless receiver 18, and antennas Ab1 to Ab100. In FIGS. 1 and 2, the number of antennas possessed by base station BS1a is exemplified as 100, but it is needless to say that the number of antennas is not limited to 100.

Processor PRB1 is configured by using, for example, a central processing unit (CPU), a micro processing unit (MPU), or a digital signal processor (DSP). Processor PRB1 cooperates with memory MB1 to perform various processes and controls. More specifically, processor PRB1 refers to the program and data stored in memory MB1 and executes the program to realize the functions of the following units. Each of these units includes UL transmission data transmission target terminal determination unit 11, UL reception weight determination unit 12, DL transmission signal generator 13, CSI-RS transmission target terminal determination unit 14, CSI acquisition unit 15, and UL reception signal decoder 16.

In a case where UL transmission data transmission target terminal determination unit 11 does not determine M terminals that can simultaneously perform spatial multiplexing communication (MU-MIMO communication) on the same frequency at every data transmission cycle, UL transmission data transmission target terminal determination unit 11 outputs an instruction to determine a transmission target terminal of a reference symbol to CSI-RS transmission target terminal determination unit 14. This is because UL transmission data transmission target terminal determination unit 11 causes CSI-RS transmission target terminal determination unit 14 to limit the terminals to transmit a reference symbol from all the terminals being in connecting to base station BS1 to a part (L specified terminals) of terminals to suppress the increase in uplink (UL, from terminal to base station BS1) traffic due to transmission of a reference symbol.

In addition, UL transmission data transmission target terminal determination unit 11 as an example of a selector selects M terminals that can simultaneously perform spatial multiplexing communication (MU-MIMO communication) on the same frequency at every data transmission cycle according to the measurement result of the channel state information based on the reception of the reference symbol transmitted from each of the L CSI-RS transmission target terminals determined by CSI-RS transmission target terminal determination unit 14. UL transmission data transmission target terminal determination unit 11 outputs information on M terminals (UL data transmission target terminal information) to UL reception weight determination unit 12 and DL transmission signal generator 13, respectively.

UL reception weight determination unit 12 calculates and determines a reception weight for forming directivity of reception beams of MIMO spatial multiplexing transmission signals (UL transmission signal) transmitted from M terminals based on the information on M terminals at every data transmission cycle. UL reception weight determination unit 12 outputs the reception weight to UL reception signal decoder 16. Since the operation of UL reception weight determination unit 12 is a known technology, a detailed description thereof will be omitted.

The DL transmission data provided from a host apparatus (for example, core network apparatus) of base station BS1 is input to down link (DL) transmission signal generator 13. The DL transmission data is the above-described user data, for example, image data or audio data.

DL transmission signal generator 13 acquires information (CSI-RS transmission target terminal information) indicating which terminal (CSI-RS transmission target terminal) is required to transmit a reference symbol. DL transmission signal generator 13 outputs a signal including an instruction to transmit a reference symbol (reference symbol transmission instruction signal) to DL wireless transmitter 17. The CSI-RS transmission target terminal information is not beamforming transmission from base station BS1 to L terminals, but is transmitted, for example, to all terminals being in connecting to base station BS1 on a common control channel. There is no need for CSI-RS transmission target terminal information to be transmitted from all of the antennas of base station BS1. Meanwhile, a reference symbol needs to be received at all of the antennas of the base station as the reference symbol is required for measurement of channel state information.

In addition, DL transmission signal generator 13 generates a DL transmission signal that can be transmitted to M terminals that can simultaneously spatial multiplexing communication (MU-MIMO communication) on the same frequency based on the UL transmission data transmission target terminal information and the DL transmission data at every data transmission cycle. That is, DL transmission signal generator 13 generates DL transmission signals that allow M terminals to receive DL transmission data and outputs the DL transmission signals to DL wireless transmitter 17 by using the beamforming technology. As described above, an example is described in detail in which base station BS1 receives UL transmission data transmitted from M terminals by spatial multiplexing communication using the beamforming technology, and a detailed description of an example of transmitting DL transmission data to M terminals by spatial multiplexing communication using the beamforming technology is omitted.

CSI-RS transmission target terminal determination unit 14 as an example of a determination unit determines L (L: an integer that satisfies 2≤L<P) terminals to transmit a reference symbol from among a total of P (P: an integer of 3 or more) terminals being in connecting to base station BS1 based on an instruction to determine terminals (CSI-RS transmission target terminals) that are required to transmit a reference symbol used to measure channel state information at every data transmission cycle. CSI-RS transmission target terminal determination unit 14 outputs information (CSI-RS transmission target terminal information) on L terminals to transmit a reference symbol to DL transmission signal generator 13.

Figure 4A:
FIG. 4A is a schematic diagram showing a first example of a connected terminal list held by the base station.
Figure 4B:
FIG. 4B is a schematic diagram showing a second example of the connected terminal list held by the base station.

FIG. 4B is a schematic diagram showing a first example of the connected terminal list held by base station BS1.

Connected terminal list T1 shown in FIG. 4A includes information on the identification number of each terminal as an example of information on the terminal being in connecting to base station BS1 and information on the sequence (order) of connection with base station BS1 at each terminal. In FIG. 4A, the terminal identification information and the sequence (order) of connection of each terminal to base station BS1 correspond to each other. Therefore, for example, base station BS1 is in connecting to a total of 60 units of terminals including the terminal identification numbers "#1" to "#60" and has started to connect in order of terminal "#1", terminal "#2", terminal "#3", . . . , terminal "#53", . . . , terminal "#59", and terminal "#60". Although not shown in FIG. 4A, the information indicating the order of connection to base station BS1 may further include, for example, time information when the terminal is in connecting to base station BS1.

CSI-RS transmission target terminal determination unit 14 reads the connected terminal list T1 stored in memory MB1 at every data transmission cycle and determines L (L: an integer that satisfies 2≤L<P) terminals to transmit a reference symbol L pieces by L pieces in order of the terminal identification numbers of respective terminals being in connecting to base station BS1. In this way, CSI-RS transmission target terminal determination unit 14 can easily and quickly determine information (that is, CSI-RS transmission target terminal information) on L terminals to transmit a reference symbol, at every data transmission cycle.

FIG. 4B is a schematic diagram showing a second example of the connected terminal list held by base station BS1.

Connected terminal list T2 shown in FIG. 4B includes information on the identification numbers (terminal identification numbers) of the respective terminals and information on the amount of UL transmission data that respective terminals are supposed to transmit to base station BS1, as an example of information on the terminals being in connecting to base station BS1. For example, amounts of UL transmission data are shown in descending order from the left side of the page of FIG. 4B toward the right side of the page. Accordingly, for example, base station BS1 is in connecting a total of 60 terminals including the terminal identification numbers "#1" to "#60" and recognizes that the amount of UL transmission data is transmitted in order of terminal "#7", terminal "#1", terminal "#3", . . . , terminal "#60", . . . , terminal "#18", and terminal "#13". The amount of UL transmission data is "27 megabytes" for terminal "#7", "26.1 megabytes" for terminal "#1", "25 megabytes" for terminal "#3", . . . , "5.2 megabytes" for terminal "#60", . . . , "2.5 megabytes" for terminal "#18", and "1.1 megabytes" for terminal "#13".

CSI-RS transmission target terminal determination unit 14 reads the connected terminal list T2 stored in memory MB1 at every data transmission cycle to determine L terminals as L (L: integer that satisfies 2≤L<P) terminals to transmit a reference symbol, in order of decreasing UL transmission data amount. In this way, CSI-RS transmission target terminal determination unit 14 can determine information (that is, CSI-RS transmission target terminal information) on L terminals to transmit a reference symbol, at every data transmission cycle so that so that communication (that is, reception) with a terminal to be a transmission source of data (for example, video data) with a large amount of UL transmission data can be continued preferentially.

In addition, CSI-RS transmission target terminal determination unit 14 may read the connected terminal list T2 stored in the memory MB1 at every data transmission cycle to change the selection frequency of the L terminals to transmit a reference symbol, according to the amount of UL transmission data. For example, in a case where the number of terminals with a large amount of UL transmission data is equal to or higher than a default value, CSI-RS transmission target terminal determination unit 14 may continuously select the same L terminals determined in a current data transmission cycle over a predetermined number of data transmission cycles including the current data transmission cycle. In this way, since a terminal with a large amount of UL transmission data can be determined as a terminal that can transmit a reference symbol over the predetermined number of data transmission cycles, CSI-RS transmission target terminal determination unit 14 can continuously support the communication between the terminal with a large amount of UL transmission data and base station BS1.

In addition, memory MT1 holds information indicating whether or not a predetermined agreement (SLA: Service Level Agreement) has been made among the terminals being in connecting to base station BS1 and rank information or level information (hereinafter, referred to as "agreement related information") in the agreement. CSI-RS transmission target terminal determination unit 14 reads the agreement-related information (not shown) stored in memory MB1 at every data transmission cycle to determine the L terminals in priority from the terminal that has made the above-described predetermined agreement and that has high rank information or level information in the agreement as L (L: an integer that satisfies 2≤L<P) terminals to transmit a reference symbol. In this way, CSI-RS transmission target terminal determination unit 14 can determine L designated terminals to transmit a reference symbol so that priority can be given to communication with the terminals of some paid-up members who have signed a predetermined agreement and also paid-up members belonging to higher ranks or levels of the agreement among the paid-up members.

CSI acquisition unit 15 uses the output (specifically, reference symbol) of UL reception signal decoder 16 to measure channel state information based on the reception of a reference symbol respectively transmitted from L terminals (CSI-RS transmission target terminal). CSI acquisition unit 15 acquires the measurement result of the channel state information. CSI acquisition unit 15 outputs the measurement result of each of the channel state information to UL transmission data transmission target terminal determination unit 11.

UL reception signal decoder 16 acquires and decodes the output (that is, UL reception signal) of UL wireless receiver 18. The decoded output of UL reception signal decoder 16 is either one or both of the reference symbol transmitted respectively from the L terminals (CSI-RS transmission target terminal) and/or the UL transmission data respectively transmitted from the M terminals (UL data transmission target terminals).

In addition, UL reception signal decoder 16 generates UL reception signals that allow reception of the UL reception signals from the M terminals that can simultaneously perform spatial multiplexing communication (MU-MIMO communication) to on the same frequency by using the reception weight and the UL reception signals obtained by decoding at every data transmission cycle. That is, UL reception signal decoder 16 generates UL reception signals that allow M terminals to receive UL transmission data and outputs the UL reception signals to a host apparatus (for example, a core network apparatus, not shown) of base station BS1 by using the beamforming technology.

In a case where UL reception signal decoder 16 obtains the reference symbol respectively transmitted from the L terminals (CSI-RS transmission target terminals), UL reception signal decoder 16 outputs the measurement result of the reference symbol to CSI acquisition unit 15.

DL wireless transmitter 17 as an example of a communicator transmits the DL transmission signals generated by DL transmission signal generator 13 by using the beamforming technology from the respective antennas Ab1 to Ab100 to the M terminals. In addition, DL wireless transmitter 17 transmits signals (reference symbol transmission instruction signals) including an instruction to transmit the reference symbol generated by DL transmission signal generator 13 from the respective antennas Ab1 to Ab100 to the P terminals.

In addition, DL wireless transmitter 17 transmits signals (UL transmission data transmission instruction signals) including an instruction to transmit the UL transmission data generated by DL transmission signal generator 13 from the respective antennas Ab1 to Ab100 to the P terminals (that is, UL transmission data transmission target terminals).

UL wireless receiver 18 as an example of a communicator receives the UL reception signals transmitted from the M units of terminals via antennas Ab1 to Ab100 and outputs the UL reception signals to UL reception signal decoder 16.

Memory MB1 includes, for example, a random access memory (RAM) as a work memory to be used at the time of processing of base station BS1 and a read only memory (ROM) for storing a program and data defining the operation of base station BS1. Various data and information are temporarily stored in the RAM. In the ROM, a program defining the operation of base station BS1 (for example, processing (steps) to be performed as the method of acquiring channel state information according to the present embodiment) is written.

In addition, memory MB1 stores (holds) connected terminal list T1 shown in FIG. 4A or connected terminal list T2 shown in FIG. 4B. In FIG. 2, memory MB1 is shown as a separate configuration from processor PRB1, but may be built in processor PRB1. Memory MB1 may include a secondary storage device together with a primary storage device.

Figure 3:
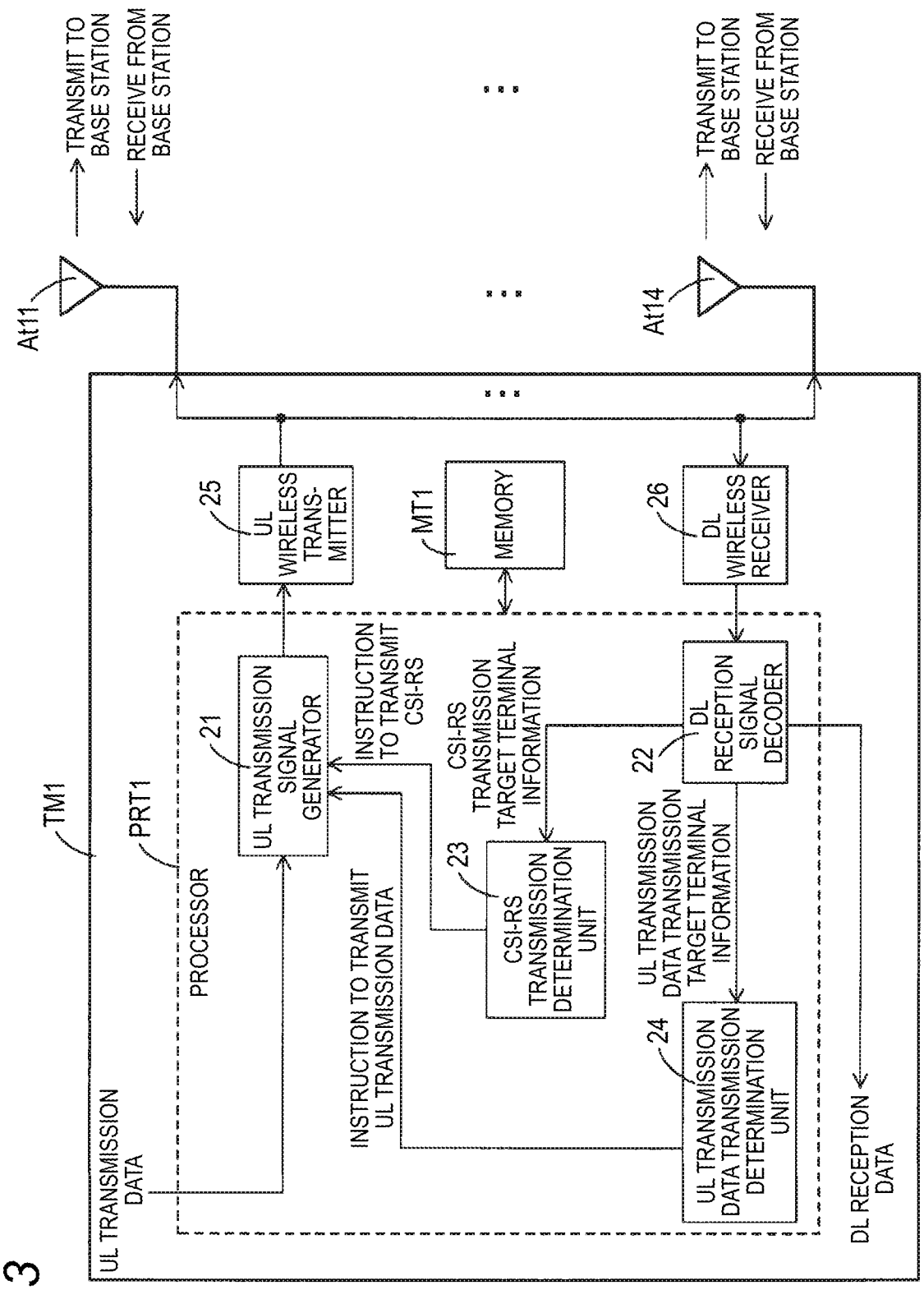
FIG. 3 is a block diagram showing an example of an internal configuration of a terminal according to Embodiment 1 in detail.

FIG. 3 is a block diagram showing an example of an internal configuration of terminal TM1 according to Embodiment 1 in detail.

Since the internal configuration of each of terminals TM1 to TM100 shown in FIG. 1 is the same, in FIG. 3, terminal TM1 will be exemplified and described in detail. Each of terminals TM1 to TM100 is a terminal that can perform wireless communication with base station BS1 and is, for example, a mobile phone, a smartphone, or a tablet terminal. Terminals TM1 to TM100 may have a telephone function or may not have a telephone function.

Terminal TM1 shown in FIG. 3 is configured to include processor PRT1, memory MT1, UL wireless transmitter 25, DL wireless receiver 26, and antennas At11 to At14. In FIGS. 1 and 3, the number of antennas possessed by terminal TM1 is exemplified as 4, but it is needless to say that the number of antennas is not limited to 4.

Processor PRT1 is configured by using, for example, a CPU, an MPU or a DSP. Processor PRT1 cooperates with memory MT1 to perform various processes and controls. More specifically, processor PRT1 refers to the program and data stored in memory MT1 and executes the program to realize the functions of the following units. Each unit includes UL transmission signal generation unit 21, DL reception signal decoder 22, CSI-RS transmission determination unit 23, and UL transmission data transmission determination unit 24.

UL transmission signal generator 21 obtains uplink data (UL transmission data) generated in response to an operation on a user application of terminal TM1, for example. In a case where it is determined by UL transmission data transmission determination unit 24 that own terminal needs to transmit UL transmission data, when acquiring an instruction to transmit UL transmission data from UL transmission data transmission determination unit 24, UL transmission signal generator 21 generates a UL transmission signal for transmitting UL transmission data to base station BS1 and transmits the UL transmission signal to UL wireless transmitter 25. The UL transmission data may be user data (for example, image data or audio data), or control data (for example, distribution request for images or audio).

In addition, in a case where it is determined by CSI-RS transmission determination unit 23 that the own terminal needs to transmit a reference symbol, when acquiring the CSI-RS transmission instruction from CSI-RS transmission determination unit 23, UL transmission signal generator 21 generates a reference symbol that is a known fixed pattern, and outputs the reference symbol to UL wireless transmitter 25.

DL reception signal decoder 22 acquires and decodes the output (that is, DL reception signal) of DL wireless receiver 26. The decoded output of DL reception signal decoder 22 is any one of CSI-RS transmission target terminal information, UL transmission data transmission target terminal information, and DL reception data transmitted from base station BS1.

In a case where DL reception signal decoder 22 obtains CSI-RS transmission target terminal information transmitted from the base station BS1, DL reception signal decoder 22 outputs the CSI-RS transmission target terminal information to CSI-RS transmission determination unit 23. In a case where DL reception signal decoder 22 obtains the UL transmission data transmission target terminal information transmitted from base station BS1, DL reception signal decoder 22 outputs the UL transmission data transmission target terminal information to UL transmission data transmission determination unit 24. In a case where DL reception signal decoder 22 has obtained the DL reception data transmitted from base station BS1, DL reception signal decoder 22 outputs the DL reception data to the application (not shown).

CSI-RS transmission determination unit 23 determines whether or not the own terminal needs to transmit a reference symbol based on the output (that is, CSI-RS transmission target terminal information) of the DL reception signal decoder 22. In a case where CSI-RS transmission determination unit 23 determines that the own terminal needs to transmit a reference symbol, CSI-RS transmission determination unit 23 outputs a CSI-RS transmission instruction for transmitting the reference symbol to UL transmission signal generator 21 according to the determination result.

For example, in a case where CSI-RS transmission determination unit 23 determines that the CSI-RS transmission target terminal information includes the identification number (for example, terminal identification number) of the own terminal, CSI-RS transmission determination unit 23 determines that the own terminal needs to transmit a reference symbol and outputs a CSI-RS transmission instruction to UL transmission signal generator 21. Meanwhile, in a case where CSI-RS transmission determination unit 23 determines that the CSI-RS transmission target terminal information does not include the identification number (for example, the terminal identification number) of the own terminal, CSI-RS transmission determination unit 23 determines that the own terminal does not need to transmit a reference symbol and outputs a signal (that is, a control signal not to transmit a reference symbol) to that effect to UL transmission signal generator 21.

UL transmission data transmission determination unit 24 determines whether the own terminal needs to transmit UL transmission data based on the output (that is, UL transmission data transmission target terminal information) of DL reception signal decoder 22. In a case where UL transmission data transmission determination unit 24 determines that the own terminal needs to transmit UL transmission data, UL transmission data transmission determination unit 24 outputs a UL transmission data transmission instruction for transmitting UL transmission data to UL transmission signal generator 21 according to the determination result.

For example, in a case where UL transmission data transmission determination unit 24 determines that the UL transmission data transmission target terminal information includes the identification number (for example, terminal identification number) of the own terminal, UL transmission data transmission determination unit 24 determines that the own terminal needs to transmit UL transmission data and outputs a UL transmission data transmission instruction to UL transmission signal generator 21. Meanwhile, in a case where UL transmission data transmission determination unit 24 determines that the UL transmission data transmission target terminal information does not include the identification number (for example, the terminal identification number) of the own terminal, UL transmission data transmission determination unit 24 determines that the own terminal does not need to transmit UL transmission data and outputs a signal (that is, a control signal not to transmit UL transmission data) to that effect to UL transmission signal generator 21.

UL wireless transmitter 25 as an example of a communication unit transmits the UL transmission signal (specifically, a UL transmission signal for transmitting a reference symbol or UL transmission data to base station BS1) generated by UL transmission signal generator 21 from antennas At11 to At14 to base station BS1.

DL wireless receiver 26 as an example of a communicator receives the DL reception signal transmitted from base station BS1 via antennas At11 to At14 to outputs the DL reception signal to DL reception signal decoder 22.

Memory MT1 includes, for example, a RAM as a work memory to be used at the time of the processing of terminal TM1, and a ROM for storing a program and data defining the operation of terminal TM1. Various data and information are temporarily stored in the RAM. For example, memory MT1 temporarily stores a reference symbol that is a known fixed pattern.

Figure 5:
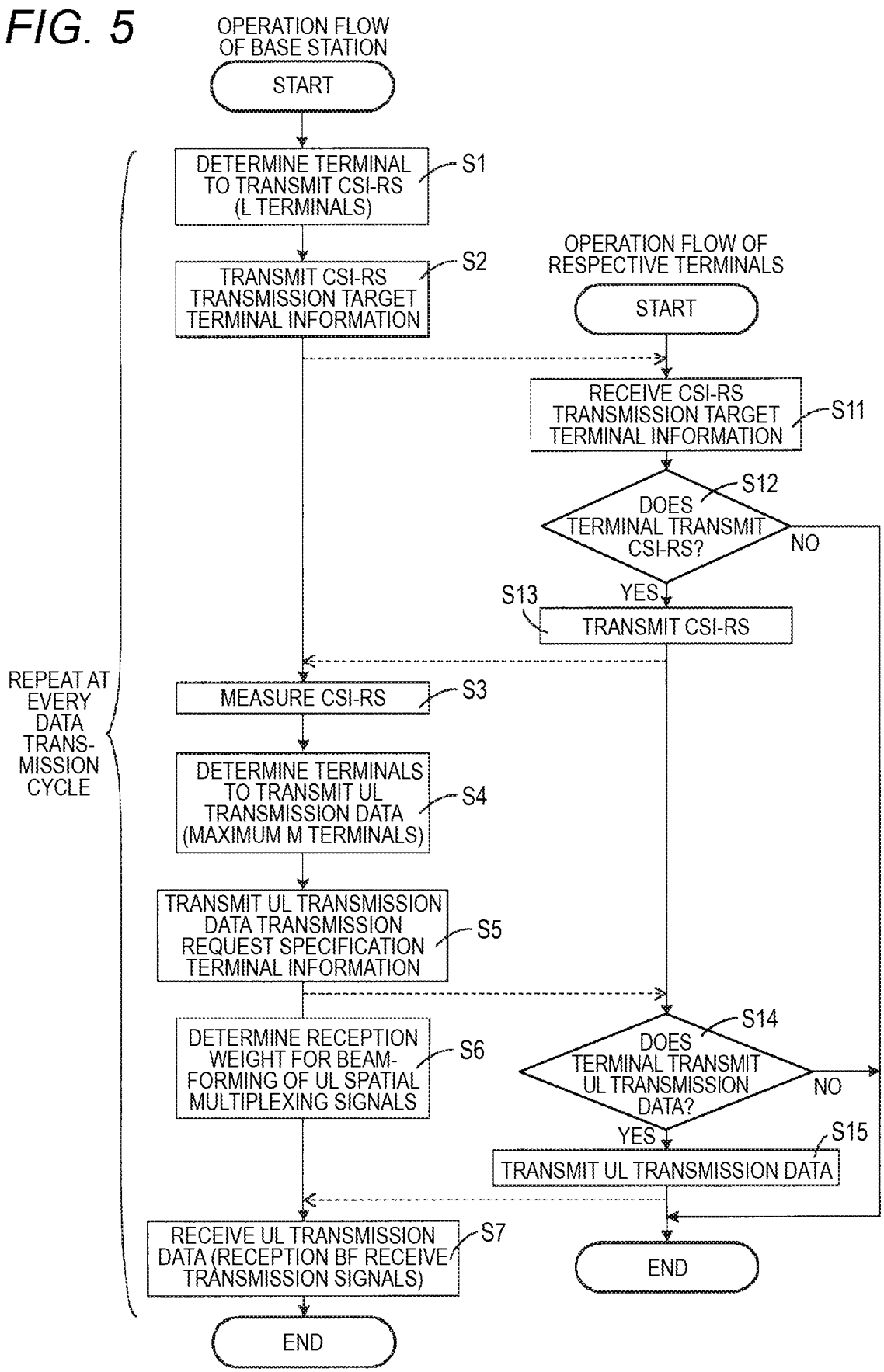
FIG. 5 is a flowchart showing an example of each operation procedure of the base station and the terminal according to Embodiment 1 in detail.

Next, the operation procedure of base station BS1 and a terminal in Embodiment 1 will be described with reference to FIG. 5. FIG. 5 is a flowchart showing an example of each operation procedure of base station BS1 and terminal TM1 according to Embodiment 1 in detail. In the description of FIG. 5, the operation procedure of the terminal will be described by exemplifying terminal TM1 shown in FIG. 1. Base station BS1 and terminal TM1 repeat the respective operation flows shown in FIG. 5 at every data transmission cycle. The operation procedure of the terminal described in FIG. 5 shows an operation flow that does not distinguish between the terminals determined as L terminals to transmit a reference symbol and the remaining terminals (specifically, (P-L) terminals) not determined as L terminals at base station BS1.

In FIG. 5, base station BS1 determines L (for example, kM, k is an integer of 2 to 5, for example) terminals to transmit a reference symbol from the P (for example, 100) terminals being in connecting to base station BS1 at every data transmission cycle (S1). As described above, for example, a method of determining L terminals is any one of a method of determining terminals in order of connection to base station BS1 based on connected terminal list T1 held in memory MB1, a method of determining terminals in descending order of the amount of UL transmission data based on connected terminal list T2 held in memory MB1, or a method of determining terminals in order from a terminal that has already made a predetermined agreement and has higher rank information or level information in the agreement. However, the determination method of L terminals may not be limited to these determination methods, and these determination methods may be combined and used in combination.

Therefore, in Embodiment 1, in the processing of step S1, transmission of a reference symbol from all (P) terminals being in connecting to base station BS1 is not performed to base station BS1, and a reference symbol is transmitted from some of the P terminals (L terminals, L<P). In this way, when the terminal transmits a reference symbol, it is possible to suppress the increase in traffic on an uplink (UL).

Base station BS1 transmits a DL transmission signal including broadcast information (that is, CSI-RS transmission target terminal information) of which L terminals are determined in step S1 (S2). A DL transmission signal including CSI-RS transmission target terminal information is transmitted not through beamforming transmission that is for a specific terminal only, but through a common control channel common to all the currently connected terminals.

Each terminal being in connecting to base station BS1 receives a DL transmission signal including the CSI-RS transmission target terminal information transmitted from base station BS1 in step S2 (S11). Then, each terminal receives the DL transmission signal (DL reception signal) transmitted from base station BS1, and then determines whether or not the own terminal needs to transmit a reference symbol based on the CSI-RS transmission target terminal information obtained by decoding the DL reception signal (S12). In a case where it is determined that the own terminal does not need to transmit a reference symbol (S12, NO), the processing of the terminal shown in FIG. 5 ends.

Meanwhile, in a case where the own terminal needs to transmit a reference symbol (S12, YES), the terminal transmits a reference symbol required for measurement of channel state information (CSI) indicating a state of a propagation path between base station BS1 and the own terminal to base station BS1 (S13).

Base station BS1 receives the reference symbol transmitted from the terminals (that is, L CSI-RS transmission target terminals) in step S13. Base station BS1 measures channel state information based on the reception of each reference symbol transmitted from the L CSI-RS transmission target terminals (S3).

Base station BS1 performs various signal processing for receiving uplink transmission data (UL transmission data) by using the beamforming technology. For example, base station BS1 selects M terminals as a transmission source of UL transmission data in consideration of whether channel state information is good or which combinations of M terminals result in a high transmission rate for each MIMO stream among the measurement results of channel state information of total L terminals measured in step S3 and base station BS1, in UL transmission data transmission target terminal determination unit 11 (S4). For example, base station BS1 causes DL wireless transmitter 17 to transmit signals (UL transmission data transmission instruction signals) including an instruction to transmit the UL transmission data generated by DL transmission signal generator 13 from the respective antennas Ab1 to Ab100 to P terminals (S5).

Base station BS1 calculates UL reception weight determination unit 12 to calculate and determine a reception weight for forming directivity of reception beams of the MIMO spatial multiplexing transmission signals (UL transmission signals) transmitted from M terminals based on the information on the M terminals (S6). The processing of step S6 may be performed after the processing of step S4.

Each terminal (P terminals) being in connecting to base station BS1 receives the signal (UL transmission data transmission instruction signal) transmitted from base station BS1, and then determines whether or not the own terminal needs to transmit UL transmission data based on the UL transmission data transmission target terminal information obtained by decoding the DL transmission signal (DL reception signal) (S14). In a case where it is determined that the own terminal does not need to transmit UL transmission data (S14, NO), the processing of the terminal shown in FIG. 5 ends.

Meanwhile, in a case where the own terminal needs to transmit UL transmission data (S14, YES), the terminal transmits a signal including UL transmission data to base station BS1 (S15).

Base station BS1 causes UL wireless receiver 18 to receive the signal (UL transmission signal) including the UL transmission data transmitted in step S15 (S7) and causes UL reception signal decoder 16 to decode the UL transmission signal. Base station BS1 generates UL reception signals that allow reception of the UL reception signals from the M terminals that can simultaneously perform spatial multiplexing communication (MU-MIMO communication) on the same frequency by using the reception weight calculated in step S6 and the UL reception signals obtained by decoding. In this way, base station BS1 can receive the UL transmission data transmitted from the selected M (<P) UL transmission data transmission target terminals from among the P terminals currently being in connecting to high accuracy by using the beamforming technology (for example, beamforming reception) and perform comfortable wireless communication with the M terminals that can perform spatial multiplexing communication at every data transmission cycle.

As described above, in wireless communication system 10 of Embodiment 1, base station BS1 stores information on all terminals (specifically, P (P: an integer of 3 or more) terminals) being in connecting to base station BS1 in memory MB1 and determines L terminals (L: an integer that satisfies 2≤L<P) to transmit a reference symbol used for measurement of channel state information indicating a state of a propagation path to base station BS1 based on information on P terminals from among the P terminals, at every data transmission cycle. Base station BS1 transmits a DL transmission signal including information on L terminals (CSI-RS transmission target terminals) to each of the terminals being in connecting to base station BS1. The L terminals corresponding to the CSI-RS transmission target terminals transmit a reference symbol to the base station BS1. Base station BS1 measures channel state information (CSI) on an uplink (UL) based on the reception of a reference symbol from L terminals (CSI-RS transmission target terminals), selects M (M: integer that satisfies 2≤M≤L) terminals that can perform spatial multiplexing communication in a data transmission cycle according to the measurement result, and receives the respective pieces of data transmitted from the M terminals by using the spatial multiplexing communication with the M terminals via the plurality of antennas Ab1 to Ab100.

That is, wireless communication system 10 limits the number of terminals to transmit a reference symbol used to measure channel state information to L terminals from all terminals (P terminals) at base station BS1. In this way, wireless communication system 10 can adaptively suppress an increase in uplink (UL) traffic caused by transmission of a reference symbol used for measurement of uplink (UL) channel state information (CSI) indicating a status of a propagation path between the respective antennas Ab1 to Ab100 of base station BS1 with which the terminals are being in contact and the respective antennas of the terminals, to base station BS1. In addition, since the terminals not determined to be L terminals in base station BS1 do not need to transmit a reference symbol, wireless communication system 10 can adaptively suppress an increase in power consumption at those terminals. In addition, wireless communication system 10 can also adaptively suppress an increase in the amount of measurement processing of uplink channel state information based on the reception of the reference symbol in base station BS1. Therefore, wireless communication system 10 may realize a good and comfortable uplink (UL) MU-MIMO communication environment between base station BS1 and the total of M terminals selected based on the measurement result of the channel state information.

In addition, the information on the P terminals held by base station BS1 in memory MB1 includes the terminal identification information at each terminal being in connecting to base station BS1. Base station BS1 determines L terminals at every data transmission cycle according to the terminal identification number corresponding to the terminal being in connecting to base station BS1 in this order. The numbers of L terminals selected at every data transmission cycle are shifted and circulated (return to No. 1 after the last number). In this way, base station BS1 can easily and quickly determine L terminals to transmit a reference symbol used for measurement of uplink (UL) channel state information at every data transmission cycle.

In addition, the information on the P terminals held by base station BS1 in memory MB1 includes information on the amount of uplink UL transmission data transmitted by base station BS1 to each terminal. Base station BS1 determines L terminals prioritizing the terminal with a larger amount of uplink UL transmission data. In this way, base station BS1 can easily determine L terminals to transmit a reference symbol used for measurement of uplink (UL) channel state information in order to prioritize and continue communication with a terminal to be a transmission source of data (for example, video data) with a large amount of UL transmission data.

In addition, the information on the P terminals held by base station BS1 in memory MB1 includes rank information in the predetermined agreement. Based on the rank information in the predetermined agreement, base station BS1 determines L terminals prioritizing a terminal with higher rank information. In this way, for example, base station BS1 can easily determine L specified terminals to transmit a reference symbol used for measurement of uplink (UL) channel state information (CSI) so that priority can be given to communication with the terminals of some paid-up members who have signed a predetermined agreement and also paid-up members belonging to higher ranks or levels of the agreement among the paid-up members.

Embodiment 2

In Embodiment 1, a terminal that transmits a reference symbol that is a fixed pattern is determined by base station BS1. In Embodiment 2, the own terminal being in connecting to the base station determines the necessity of transmission of a reference symbol.

Since the configuration of wireless communication system 10 according to Embodiment 2 is the same as the configuration of wireless communication system 10 according to Embodiment 1 shown in FIG. 1, the description overlapping with Embodiment 1 will be simplified or omitted. In Embodiment 2, wireless communication system 10 is configured to include one base station BS1a and a plurality of terminals TM1a, TM2a, TM100a. In Embodiment 2, the internal configuration of base station BS1a and the respective terminals is different in part from the internal configuration of base station BS1 and the respective terminals of Embodiment 1.

Figure 6:
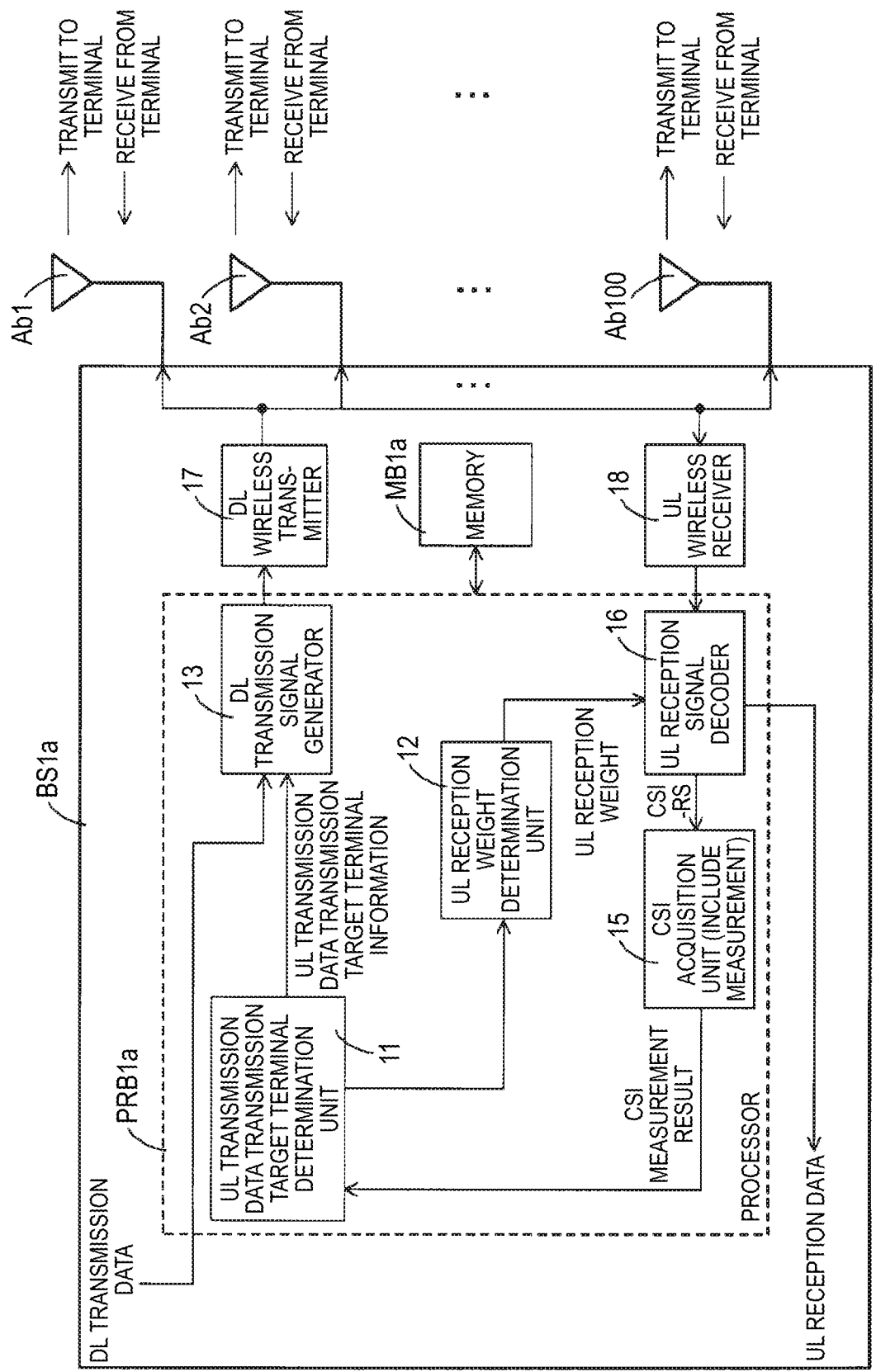
FIG. 6 is a block diagram showing an example of an internal configuration of a base station according to Embodiment 2 in detail.

FIG. 6 is a block diagram showing an example of an internal configuration of base station BS1a according to Embodiment 2 in detail.

Base station BS1a shown in FIG. 6 is configured to include processor PRB1a, memory MB1a, DL wireless transmitter 17, UL wireless receiver 18, and antennas Ab1 to Ab100. In FIGS. 1 and 6, the number of antennas possessed by base station BS1a is exemplified as 100, but it is needless to say that the number of antennas is not limited to 100.

Processor PRB1a is configured by using, for example, a CPU, an MPU or a DSP. Processor PRB1a cooperates with memory MB1a to perform various processes and controls. More specifically, processor PRB1a refers to the program and data stored in memory MB1a and executes the program to realize the functions of the following units. Each unit includes UL transmission data transmission target terminal determination unit 11, UL reception weight determination unit 12, DL transmission signal generator 13, CSI acquisition unit 15, and UL reception signal decoder 16, but the operations of these units are substantially the same as in Embodiment 1, and thus the description thereof is omitted.

In Embodiment 1, a control signal (that is, CSI-RS transmission target terminal information) specifying L terminals (CSI-RS transmission target terminals) is transmitted from base station BS1 to each of the terminals being in connecting to base station BS1. In Embodiment 2, whether or not to transmit a reference symbol is determined autonomously at each terminal being in connecting to base station BS1a, and the reference symbol is transmitted to base station BS1a by the terminal which has determined itself to transmit the reference symbol.

Memory MB1a includes, for example, a RAM as a work memory to be used at the time of processing of base station BS1a, and a ROM for storing a program and data defining the operation of base station BS1a. Various data and information are temporarily stored in the RAM.

Figure 7:
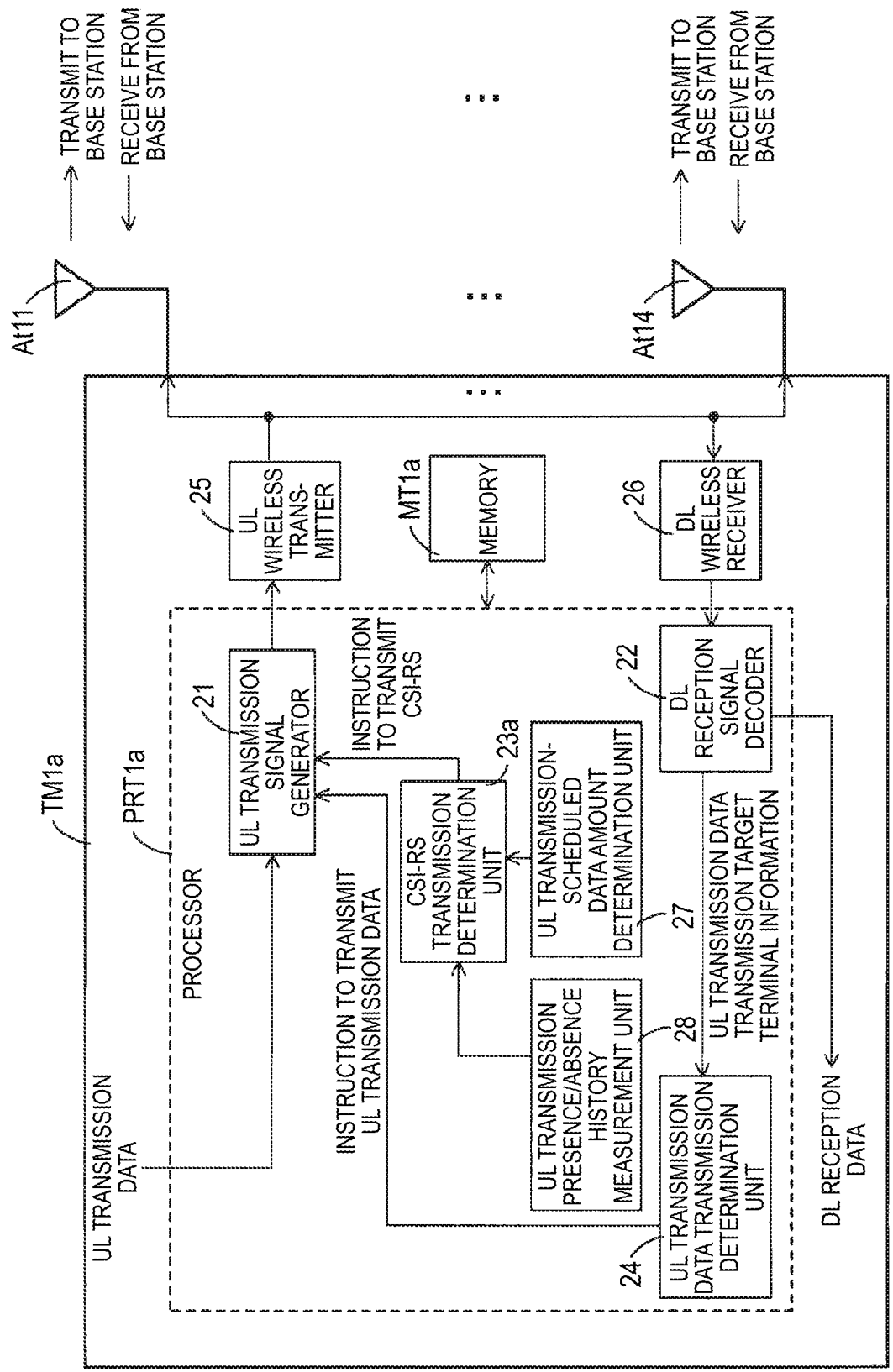
FIG. 7 is a block diagram showing an example of an internal configuration of a terminal according to Embodiment 2 in detail.

FIG. 7 is a block diagram showing an example of an internal configuration of a terminal according to Embodiment 2 in detail.

Since the internal configuration of each of terminals TM1a to TM100a shown in FIG. 1 is the same, in FIG. 7, terminal TM1a will be exemplified and described in detail.

Terminal TM1a shown in FIG. 7 is configured to include processor PRT1a, memory MT1a, UL wireless transmitter 25, DL wireless receiver 26, and antennas At11 to At14. In FIGS. 1 and 7, the number of antennas possessed by terminal TM1a is exemplified as 4, but it is needless to say that the number of antennas is not limited to 4.

Processor PRT1a is configured by using, for example, a CPU, an MPU or a DSP. Processor PRT1a cooperates with memory MT1a to perform various processes and controls. More specifically, processor PRT1a refers to the program and data stored in memory MT1a and executes the program to realize the functions of the following units. Each unit include UL transmission signal generator 21, DL reception signal decoder 22, CSI-RS transmission determination unit 23a, UL transmission data transmission determination unit 24, UL transmission-scheduled data amount determination unit 27, and UL transmission presence/absence history measurement unit 28, but the operations of UL transmission signal generator 21, DL reception signal decoder 22, and UL transmission data transmission determination unit 24 are the same as in Embodiment 1, and thus the description thereof is omitted.

The decoded output of DL reception signal decoder 22 is the DL reception data transmitted from base station BS1a. There may be no DL reception data addressed to the own terminal.

In a case where DL reception signal decoder 22 has obtained the DL reception data transmitted from base station BS1a, DL reception signal decoder 22 outputs the DL reception data to the application (not shown).

UL transmission-scheduled data amount determination unit 27 reads the terminal-related information (an example of information on the own terminal, see FIG. 8) stored (held) in memory MT1a at every data transmission cycle to determine the amount of data [megabyte] scheduled to be transmitted on an uplink (UL) from the own terminal to base station BS1a. UL transmission-scheduled data amount determination unit 27 outputs information on the determination value of the amount of data scheduled to be transmitted on an uplink to CSI-RS transmission determination unit 23a.

UL transmission presence/absence history measurement unit 28 reads the terminal-related information (an example of the information on the own terminal, see FIG. 8) stored (held) in memory MT1a at every data transmission cycle to measure the state of the past transmission history at every data transmission cycle from the own terminal to base station BS1a. UL transmission presence/absence history measurement unit 28 outputs information on the measurement result of the state of the past transmission history at every data transmission cycle to CSI-RS transmission determination unit 23a.

CSI-RS transmission determination unit 23a reads the terminal-related information (an example of the information on the own terminal, see FIG. 8) stored (held) in memory MT1a at every data transmission cycle to determine whether or not the own terminal needs to transmit a reference symbol based on the terminal related information on the own terminal.

FIG. 8 is a diagram showing an example of terminal-related information for each terminal being in connecting to base station BS1a.

In FIG. 8, terminal-related information of all the terminals (for example, P=100) being in connecting to base station BS1a are shown combined, but memory MT1a of each terminal holds only the information of the record corresponding to the terminal identification number of the own terminal shown in FIG. 8. The terminal-related information shown in FIG. 8 is updated by processor PRT1a, for example, at every data transmission cycle.

The terminal-related information of each terminal held in memory MT1a includes terminal identification number, group, amount of UL data scheduled to be transmitted at every data transmission cycle, value n (see below) of a terminal, UL transmission history at every past data transmission cycle, the number of data transmission cycles in which data has not been transmitted consecutively in the past (value r, see below), and a determination result of necessity of transmitting a reference symbol.

The group is set corresponding to the terminal identification number (for example, the value of the lower 1 digit or the lower 2 digits of the terminal identification number). In FIG. 8, for example, the group is set corresponding to the value of the lower 1 digit, and a terminal whose lower 1 digit of the terminal identification number is "1" is set to group "G1", a terminal whose lower 1 digit of the terminal identification number is "2" is set to group "G2", . . . , and a terminal whose lower 1 digit of the terminal identification number is "0" is set to group "G10". In addition, the group setting method is not limited to the method of setting corresponding to the lower 1 digit or the lower 2 digits of the terminal identification number. In addition, the terminal identification number may be, for example, a telephone number of a terminal or a manufacturing number of a terminal.

CSI-RS transmission determination unit 23a determines whether or not the own terminal needs to transmit a reference symbol in order of the group. In this case, each of the terminals being in connecting to base station BS1a synchronously recognizes the update of the group number to which the own terminal belongs, at every data transmission cycle and recognizes which group number of a terminal is a target for transmitting a reference symbol in a current data transmission cycle. CSI-RS transmission determination unit 23a determines whether or not the own terminal transmits a reference symbol in the current data transmission cycle based on information indicating which group number of a terminal is a target for transmitting a reference symbol. In this way, CSI-RS transmission determination unit 23a can easily and quickly determine whether or not it is necessary to transmit a reference symbol, at every data transmission cycle. In addition, the transmission of CSI-RS transmission terminal information from base station BS1 to a terminal, which is necessary in Embodiment 1, can be made unnecessary in Embodiment 2.

Value n of the terminal is a threshold used when CSI-RS transmission determination unit 23a determines whether or not the own terminal needs to transmit a reference symbol.

CSI-RS transmission determination unit 23a determines whether or not the own terminal needs to transmit a reference symbol based on value n read from the terminal-related information on the own terminal stored (held) in memory MT1a and information on the measurement result of the status of the past transmission history at every data transmission cycle from UL transmission presence/absence history measurement unit 28. Specifically, in a case where uplink data (UL transmission data) has not been transmitted in the past n data transmission cycles, CSI-RS transmission determination unit 23a determines that the own terminal needs to transmit a reference symbol. In this way, CSI-RS transmission determination unit 23a can expect that base station BS1a does not continues to transmit uplink data (UL transmission data) only to a specific terminal and uplink data (UL transmission data) is transmitted at the own terminal which has not transmitted the uplink data (UL transmission data) for a while.

In addition, value n may be a predetermined integer value (that is, a fixed value) of 2 or more, for example. In this way, CSI-RS transmission determination unit 23a can transmit uplink data (UL transmission data) uniformly and equally in all terminals being in connecting to base station BS1a. Therefore, CSI-RS transmission determination unit 23a may support so that base station BS1a performs spatial multiplexing communication with many terminals at every short data transmission cycle (for example, 1 ms or 10 ms).

In addition, CSI-RS transmission determination unit 23a may change value n to a value at every data transmission cycle based on the information on the determination value of the amount of data scheduled to be received on an uplink from UL transmission-scheduled data amount determination unit 27 without setting value n as a fixed value. For example, CSI-RS transmission determination unit 23a may obtain value n at every data transmission cycle by calculating value n="10±(amount of data scheduled to be transmitted on an uplink [megabytes])". In this way, in a case where CSI-RS transmission determination unit 23a transmits uplink data (UL transmission data) having a large size in view of the size of uplink data (UL transmission data) to be transmitted to base station BS1a, for example, the terminal can set value n as a small value in an adaptive manner so that the priority of communication with base station BS1a increases. In addition, in a case where CSI-RS transmission determination unit 23a transmits uplink data (UL transmission data) having a large size in view of the size of uplink data (UL transmission data) to be transmitted to base station BS1a, for example, the terminal can set value n as a small value in an adaptive manner so that the priority of communication with base station BS1a increases.

In FIG. 8, the past UL transmission history indicates the presence or absence of transmission of uplink data (UL transmission data) at every data transmission cycle ("∘" indicates reception, and "x" indicates no reception") from the left side of the page of FIG. 8 toward the right side of the page.

For example, at the terminal with terminal identification number "#1", there is no transmission of uplink data (UL transmission data) in the last five times of data transmission cycles, and r=5. Therefore, in a case where CSI-RS transmission determination unit 23a determines whether or not it is necessary to transmit a reference symbol by using value n of the own terminal, in the terminal with the terminal identification number "#1", CSI-RS transmission determination unit 23a determines that the own terminal needs to transmit a reference symbol because n(=4)<r(=5).

For example, at the terminal with terminal identification number "#2", there is no transmission of uplink data (UL transmission data) in the last two times of data transmission cycles, and r=2. Therefore, in a case where CSI-RS transmission determination unit 23a determines whether or not it is necessary to transmit a reference symbol by using value n of the own terminal, in the terminal with the terminal identification number "#2", CSI-RS transmission determination unit 23a determines that the own terminal does not need to transmit a reference symbol because n(=33)>r(=2). In a case where CSI-RS transmission determination unit 23a determines whether or not it is necessary to transmit a reference symbol by using value n of the own terminal, the same determination is made in other terminals.

Memory MT1a includes, for example, a RAM as a work memory to be used at the time of the processing of terminal TM1a, and a ROM for storing a program and data defining the operation of terminal TM1a. Various data and information are temporarily stored in the RAM. For example, memory MT1a temporarily stores a reference symbol, which are known fixed patterns, and terminal related information (see FIG. 8) the own terminal.

Figure 9:
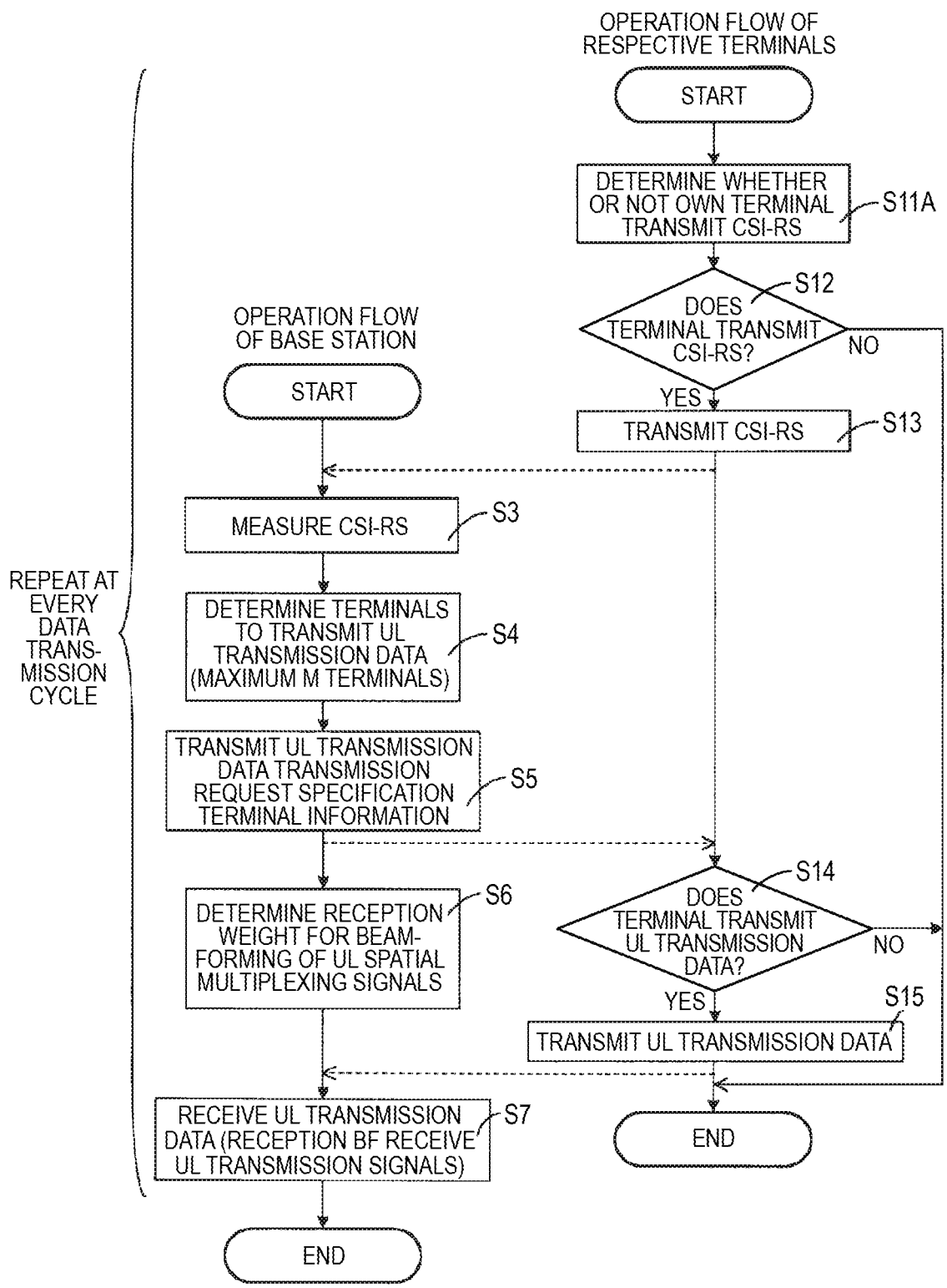
FIG. 9 is a flowchart showing an example of each operation procedure of the base station and the terminal according to Embodiment 2 in detail.

Next, the operation procedure of base station BS1a and a terminal in Embodiment 2 will be described with reference to FIG. 9. FIG. 9 is a flowchart showing an example of each operation procedure of base station BS1a and a terminal according to Embodiment 2 in detail. In the description of FIG. 9, the operation procedure of the terminal will be described by exemplifying terminal TM1a shown in FIG. 1. Base station BS1a and terminal TM1a repeat the respective operation flows shown in FIG. 9 at every data transmission cycle.

In FIG. 9, terminal TM1a reads the terminal-related information (an example of the information on the own terminal, see FIG. 8) stored (held) in memory MT1a determine whether or not the own terminal needs to transmit a reference symbol based on the terminal-related information on the own terminal (S11A). As described above, for example, a method of determining whether it is necessary for the own terminal to transmit a reference symbol is any one of a method of determining whether a terminal belongs to a group indicated by group information corresponding to the terminal identification number of the own terminal based on the terminal-related information held in memory MT1a or a method of determining whether or not uplink data (UL transmission data) has been transmitted over the past n data transmission cycles based on the terminal-related information held in memory MT1a. However, the method of determining whether or not the own terminal needs to measure and report the channel state information (CSI) may not be limited to these determination methods, and these determination methods may be combined and used in combination.

Therefore, in Embodiment 2, in the processing of step S11A, transmission of a reference symbol from all (P) terminals being in connecting to base station BS1a is not performed to base station BS1a, and a reference symbol is transmitted from some of the P terminals. In this way, when the terminal transmits a reference symbol, it is possible to suppress the increase in traffic on an uplink (UL).

Terminal TM1a determines whether or not the own terminal needs to transmit a reference symbol (S12). In a case where terminal TM1a determines that the own terminal does not need to transmit a reference symbol (S12, NO), the processing of terminal TM1a shown in FIG. 9 ends.

Meanwhile, in a case where the own terminal needs to transmit a reference symbol (S12, YES), terminal TM1a transmits a reference symbol required for measurement of channel state information indicating a state of a propagation path between base station BS1 and the own terminal to base station BS1a (S13).

Base station BS1a receives the reference symbol transmitted from the terminal (that is, the terminal that has transmitted CSI-RS) in step S13. Base station BS1a measures channel state information based on the reception of the transmitted reference symbol (S3).

Base station BS1a performs various signal processing for receiving uplink transmission data (UL transmission data) by using the beamforming technology. For example, base station BS1a selects M terminals as a transmission source of UL transmission data in consideration of whether channel state information is good or which combinations of M terminals result in a high transmission rate for each MIMO stream among the measurement results of channel state information of a part of the terminals measured in step S3 and base station BS1a, in UL transmission data transmission target terminal determination unit 11 (S4). For example, base station BS1a causes DL wireless transmitter 17 to transmit signals (UL transmission data transmission instruction signals) including an instruction to transmit the UL transmission data generated by DL transmission signal generator 13 from the respective antennas Ab1 to Ab100 to P terminals (S5).

Base station BS1a calculates UL reception weight determination unit 12 to calculate and determine a reception weight for forming directivity of reception beams of the MIMO spatial multiplexing transmission signals (UL transmission signals) transmitted from M terminals based on the information on the M terminals (S6). The processing of step S6 may be performed after the processing of step S4.

Each terminal (P terminals) being in connecting to base station BS1 receives the signal (UL transmission data transmission instruction signal) transmitted from base station BS1, and then determines whether or not the own terminal needs to transmit UL transmission data based on the UL transmission data transmission target terminal information obtained by decoding the DL transmission signal (DL reception signal) (S14). In a case where it is determined that the own terminal does not need to transmit UL transmission data (S14, NO), the processing of the terminal shown in FIG. 5 ends.

Meanwhile, in a case where the own terminal needs to transmit UL transmission data (S14, YES), the terminal transmits a signal including UL transmission data to base station BS1 (S15).

Base station BS1 causes UL wireless receiver 18 to receive the signal (UL transmission signal) including the UL transmission data transmitted in step S15 (S7) and causes UL reception signal decoder 16 to decode the UL transmission signal. Base station BS1 generates UL reception signals that allow reception of the UL reception signals from the M terminals that can simultaneously perform spatial multiplexing communication (MU-MIMO communication) on the same frequency by using the reception weight calculated in step S6 and the UL reception signals obtained by decoding. In this way, base station BS1 can receive the UL transmission data transmitted from the selected M (<P) UL transmission data transmission target terminals from among the P terminals being in connecting to high accuracy by using the beamforming technology (for example, beamforming reception) and perform comfortable wireless communication with the M terminals that can perform spatial multiplexing communication at every data transmission cycle.

As described above, in wireless communication system 10 of Embodiment 2, the terminal being in connecting to base station BS1a holds terminal-related information (an example of information on the own terminal) on the own terminal in memory MT1a to determine the necessity of transmission of a reference symbol used for measurement of channel state information indicating a state of a propagation path to base station BS1a based on terminal-related information on the own terminal, at every data transmission cycle. The terminal transmits a reference symbol to base station BS1a based on the determination to transmit a reference symbol. Base station BS1a measures channel state information (CSI) based on the reception of the reference symbol from the terminal to select M (M: default value of 2 or more) terminals that can perform spatial multiplexing communication in a data transmission cycle according to the measurement result. Base station BS1a receives respective pieces of data (UL transmission data) transmitted from M terminals by using spatial multiplexing communication with the selected M terminals via the plurality of antennas Ab1 to Ab100.

That is, wireless communication system 10 causes each of all terminals (P terminals) being in connecting to base station BS1a to determine whether or not it is necessary to transmit a reference symbol used to measure channel state information (CSI). As a result of this determination, transmission of a reference symbol is performed only in some of the P terminals (for example, the number of L terminals in Embodiment 1, or including some extent of increase and decrease from L pieces). In this way, wireless communication system 10 can adaptively suppress an increase in uplink (UL) traffic caused by transmission of a reference symbol used for measurement of channel state information (CSI) indicating a status of a propagation path between the respective antennas Ab1 to Ab100 of base station BS1a with which the terminals are being in contact and the respective antennas of the terminals, to base station BS1a. In addition, since it is possible to autonomously determine terminals that do not need to transmit a reference symbol at the terminals, wireless communication system 10 can adaptively suppress an increase in power consumption at those terminals. In addition, wireless communication system 10 can also adaptively suppress an increase in the amount of measurement processing of uplink channel state information based on the reception of the reference symbol in base station BS1a. Therefore, wireless communication system 10 may realize a good and comfortable downlink (DL) MU-MIMO communication environment between base station BS1a and the total of M terminals selected based on the measurement result of the channel state information.

In addition, the terminal-related information on the own terminal held by each terminal in memory MT1a includes group information corresponding to the terminal identification number of the own terminal. The terminal determines whether or not the own terminal needs to transmit a reference symbol in order of the group indicated by the group information. In this way, the terminal can easily and quickly determine whether or not it is necessary to transmit a reference symbol, at every data transmission cycle.

In addition, the terminal-related information on the own terminal held by each terminal in memory MT1a includes transmission history information indicating the presence or absence of transmission of uplink data (UL transmission data) from base station BS1a at every past data transmission cycle. In a case where there is no transmission of data to base station BS1a over the past n (n: integer of 2 or more) times of data transmission cycles, the terminal determines to transmit a reference symbol. In this way, the terminal can expect that base station BS1a does not continues to transmit uplink data (UL transmission data) only to a specific terminal and uplink data (UL transmission data) is transmitted at the own terminal which has not transmitted the uplink data (UL transmission data) for a while.

In addition, in the terminal-related information on the own terminal held by each terminal in memory MT1a, value n may be a fixed value. In this way, the terminal can transmit uplink data (UL transmission data) uniformly and equally in all terminals being in connecting to base station BS1a. Therefore, the terminal may support so that base station BS1a performs spatial multiplexing communication with many terminals at every short data transmission cycle (for example, 1 ms or 10 ms).

In addition, the terminal-related information on the own terminal held by each terminal in memory MT1a further includes information on the amount of uplink data (UL transmission data amount) to be transmitted to base station BS1a. In a case where the amount of uplink data to be transmitted to base station BS1a (the amount of UL transmission data) is higher than a predetermined threshold, the terminal sets value n lower than a current value according to the amount of uplink data (UL transmission data amount). In this way, in a case where the terminal transmits uplink data (UL transmission data) having a large size in view of the size of uplink data (UL transmission data) to be transmitted to base station BS1a, for example, the terminal can set value n as a small value in an adaptive manner so that the priority of communication with base station BS1a increases.

In addition, the terminal-related information on the own terminal held by each terminal in memory MT1a further includes information on the amount of uplink data (UL transmission data amount) to be transmitted to base station BS1a. In a case where the amount of uplink data to be transmitted to base station BS1a (the amount of UL transmission data) is lower than a predetermined threshold, the terminal sets value n larger than a current value according to the amount of uplink data (UL transmission data amount). In this way, in a case where the terminal transmits uplink data (UL transmission data) having a small size in view of the size of uplink data (UL transmission data) to be transmitted to base station BS1a, for example, the terminal can set value n as a large value in an adaptive manner so that the priority of communication with base station BS1a decreases.

In addition, the reference symbol described above may be called sounding reference symbol (SRS) instead of channel state information reference symbol (CRI-RS). That is, the above-described CRI-RS may be replaced by SRS. In addition, the reference symbol (RS) described above may be replaced by a reference signal. When replaced by a reference signal, CRI-RS becomes "channel state information reference signal", and SRS becomes "sounding reference signal".

While various exemplary embodiments have been described with reference to the drawings, it goes without saying that the present disclosure is not limited to such examples. Within the category described in the claims, it will be apparent to those skilled in the art that various changed examples or modification examples may be conceived, and it should be understood that such modifications naturally belong to the technical scope of the present disclosure. In addition, each constituent element in the above embodiment may be arbitrarily combined without departing from the gist of the invention.

The present application is based on Japanese Patent Application No. 2017-076079 filed on Apr. 6, 2017, the contents of which are incorporated by reference into the present application.

INDUSTRIAL APPLICABILITY

The present disclosure is useful as a terminal, a base station, a wireless communication system, and a method of acquiring channel state information that realize a comfortable MU-MIMO communication environment by adaptively suppressing an increase in uplink traffic caused by transmission of a reference symbol necessary for measurement of uplink channel state information from respective terminals to a base station at every data transmission cycle and an increase in the amount of measurement processing of channel state information based on the reception of a reference symbol at the base station.

REFERENCE SIGNS LIST 10 wireless communication system
11 UL transmission data transmission target terminal determination unit (selector)
12 UL reception weight determination unit
13 DL transmission signal generator
14 CSI-RS transmission target terminal determination unit (determination unit)
15 CSI acquisition unit
16 UL reception signal decoder
17 DL wireless transmitter
18 UL wireless receiver
21 UL transmission signal generator
22 DL reception signal decoder
23, 23a CSI-RS transmission determination unit
24 UL transmission data transmission determination unit
25 UL wireless transmitter
26 DL wireless receiver
27 UL transmission-scheduled data amount determination unit
28 UL transmission presence/absence history measurement unit
Ab1, Ab2, Ab100, At11, At14, At21, At24, At1001, At1004 antenna
BS1, BS1a base station TM1, TM1a, TM2, TM2a, TM100, TM100a terminal
MB1, MB1a, MT1, MT1a memory
PRB1, PRB1a, PRT1, PRT1a processor
T1, T2 connected terminal list

The invention claimed is:

1. A base station capable of wireless communication with a plurality of terminals, the base station comprising:
a memory that holds information on P terminals being currently connected to the base station, where P is an integer of 3 or more, and where the information on the P terminals includes transmission history information indicating presence or absence of data transmission to the base station at every past data transmission cycle;
a processor that
determines L terminals that are to transmit a reference symbol used for measurement of channel state information indicating a state of a propagation path to the base station from among the P terminals based on the information on the P terminals, at every data transmission cycle, where L is an integer satisfying 2≤L<P, wherein the processor determines a terminal, whose transmission history information indicates no data transmission to the base station for the past n data transmission cycles where n is an integer of 2 or more, as one of the L terminals that are to transmit the reference symbol; and
selects M terminals that are capable of spatial multiplexing communication in the data transmission cycle according to the channel state information based on the reference symbols transmitted from the L terminals, where M is an integer satisfying 2≤M≤L; and
a communicator that receives data transmitted from the M terminals using the spatial multiplexing communication via a plurality of antennas.

2. The base station according to claim 1, wherein the information on the P terminals includes terminal identification information on respective terminals currently connected to the base station, and
the processor determines the L terminals in order of the terminal identification information on the respective terminals.

3. The base station according to claim 1, wherein the information on the P terminals includes information on an amount of uplink data to be transmitted from respective terminals, and
the processor determines the L terminals in preference to a terminal with a larger amount of uplink data.

4. The base station according to claim 1, wherein the information on the P terminals includes rank information in a predetermined agreement, and
the processor determines the L terminals in preference to a terminal having higher rank information based on the rank information in the predetermined agreement.

5. A method of acquiring channel state information in a base station capable of wireless communication with a plurality of terminals, the method comprising:
a step of holding information on P terminals currently connected to the base station, where P is an integer of 3 or more, and where the information on the P terminals includes transmission history information indicating presence or absence of data transmission to the base station at every past data transmission cycle;
a step of determining L terminals that are to transmit a reference symbol used for measurement of channel state information indicating a state of a propagation path to the base station from among the P terminals based on the information on the P terminals, at every data transmission cycle, where L is an integer satisfying 2≤L<P, wherein the determining includes determining a terminal, whose transmission history information indicates no data transmission to the base station for the past n data transmission cycles where n is an integer of 2 or more, as one of the L terminals that are to transmit the reference symbol;

a step of selecting M terminals that are capable of spatial multiplexing communication in the data transmission cycle according to the channel state information based on the reference symbols transmitted from the L terminals, where M is an integer satisfying 2≤M<L; and a step of receiving respective data transmitted from the M terminals by using the spatial multiplexing communication via a plurality of antennas.

6. A wireless communication system capable of wireless communication between a plurality of terminals and a base station, wherein the base station holds information on P terminals currently connected to the base station, where P is an integer of 3 or more, and where the information on the P terminals includes transmission history information indicating presence or absence of data transmission to the base station at every past data transmission cycle, and determines L terminals that are to transmit a reference symbol used for measurement of channel state information indicating a state of a propagation path to the base station from among the P terminals based on the information on the P terminals, at every data transmission cycle, and transmits a transmission instruction for the reference symbol to the L terminals, where L is an integer satisfying 2≤L<P, and determines a terminal, whose transmission history information indicates no data transmission to the base station for the past n data transmission cycles where n is an integer of 2 or more, as one of the L terminals that are to transmit the reference symbol, the terminals transmit the reference symbol based on the transmission instruction for the reference symbol transmitted from the base station, and the base station selects M terminals that are capable of spatial multiplexing communication in the data transmission cycle according to the channel state information based on the reference symbols transmitted from the L terminals, where M is an integer satisfying 2≤M≤L, and receives data transmitted from the M terminals using the spatial multiplexing communication via a plurality of antennas.

7. A terminal capable of communicating with a base station, the terminal comprising:

a memory that holds information on the terminal itself, where the information on the terminal itself includes transmission history information indicating presence or absence of data transmission to the base station at every past data transmission cycle;

a processor that determines necessity of transmitting a reference symbol used for measurement of channel state information indicating a state of a propagation path to the base station based on the information on the terminal itself, at every data transmission cycle, wherein the processor determines to transmit the reference symbol when the transmission history information indicates no data transmission to the base station for the past n data transmission cycles where n is an integer of 2 or more; and a communicator that transmits the reference symbol to the base station based on the determination to transmit the reference symbol, wherein the communicator transmits data to the base station in a case where the terminal is one of M terminals capable of spatial multiplexing communication with the base station in the data transmission cycle that are selected according to the channel state information based on the reference symbols transmitted to the base station, where M is a value of 2 or more.

8. The terminal according to claim 7, wherein the information on the terminal itself includes group information corresponding to an identification number of the terminal itself, and the processor determines whether or not to transmit the reference symbol based on the group information.

9. The terminal according to claim 7, wherein the value n is a predefined integer value of 2 or more.

10. The terminal according to claim 7, wherein the information on the terminal itself further includes information on an amount of data to be transmitted to the base station, and in a case where the amount of data to be transmitted to the base station is larger than a predetermined threshold, the processor sets the value n to be smaller than a current value according to the amount of data.

11. The terminal according to claim 7, wherein the information on the terminal itself further includes information on an amount of data to be transmitted to the base station, and in a case where the amount of data to be transmitted to the base station is smaller than a predetermined threshold, the processor sets the value n to be larger than a current value according to the amount of data.

12. A method of acquiring channel state information in a terminal capable of communicating with a base station, the method comprising:

a step of holding information on the terminal itself, where the information on the terminal itself includes transmission history information indicating presence or absence of data transmission to the base station at every past data transmission cycle;

a step of determining necessity of transmitting a reference symbol used for measurement of channel state information indicating a state of a propagation path to the base station based on the information on the terminal itself, at every data transmission cycle, wherein the determining includes determining to transmit the reference symbol when the transmission history information indicates no data transmission to the base station for the past n data transmission cycles where n is an integer of 2 or more;

a step of transmitting the reference symbol to the base station based on the determination to transmit the reference symbol; and a step of transmitting data to the base station in a case where the terminal is one of M terminals capable of spatial multiplexing communication with the base station in the data transmission cycle that are selected according to the channel state information based on the reference symbols transmitted to the base station, where M is a value of 2 or more.

13. A wireless communication system capable of wireless communication between a plurality of terminals and a base station, wherein each terminal holds information on the terminal itself, where the information on the terminal itself includes transmission history information indicating presence or absence of data transmission to the base station at every past data transmission cycle, determines necessity of transmitting a reference symbol used for measurement of channel state information indicating a state of a propagation path to the base station based on the information on the terminal itself, at every data transmission cycle, and determines to transmit the reference symbol when the transmission history information indicates no data transmission to the base station for the past n data transmission cycles where n is an integer of 2 or more, and transmits the reference symbol to the base station based on the determination to transmit the reference symbol, and the base station selects M terminals capable of spatial multiplexing communication in the data transmission cycle according to the channel state information based on the reference symbols transmitted from the plurality of terminals, where M is a value of 2 or more, and receives data transmitted from the selected M terminals capable of spatial multiplexing communication via a plurality of antennas.

* * * * *